US 8,285,012 B2

(12) United States Patent
Kadomura et al.

(10) Patent No.: US 8,285,012 B2
(45) Date of Patent: Oct. 9, 2012

(54) IMAGE DISPLAY APPARATUS AND PROGRAM

(75) Inventors: Takayuki Kadomura, Abiko (JP);
Osamu Miyazaki, Moriya (JP);
Hiromitsu Hayashi, Tokyo (JP); Hiroto Kokubun, Kashiwa (JP); Yoshihiro Goto, Tokyo (JP)

(73) Assignee: Hitachi Medical Corporation, Tokyo (JP)

(*) Notice: Subject to any disclaimer, the term of this patent is extended or adjusted under 35 U.S.C. 154(b) by 1101 days.

(21) Appl. No.: 11/919,376

(22) PCT Filed: Apr. 25, 2006

(86) PCT No.: PCT/JP2006/308622
§ 371 (c)(1),
(2), (4) Date: Oct. 25, 2007

(87) PCT Pub. No.: WO2006/118100
PCT Pub. Date: Nov. 9, 2006

(65) Prior Publication Data
US 2010/0215225 A1     Aug. 26, 2010

(30) Foreign Application Priority Data

Apr. 28, 2005   (JP) ................................ 2005-132401
May 19, 2005   (JP) ................................ 2005-147214
Sep. 7, 2005    (JP) ................................ 2005-259817

(51) Int. Cl.
*G06K 91/00*           (2006.01)
(52) U.S. Cl. .................. 382/128; 382/131; 345/419
(58) Field of Classification Search .................. 382/128
See application file for complete search history.

(56) References Cited

U.S. PATENT DOCUMENTS

| 6,232,980 | B1 * | 5/2001 | Liepa ........................... 345/419 |
| 6,252,599 | B1 * | 6/2001 | Natsuko et al. ............... 345/419 |
| 6,463,167 | B1 * | 10/2002 | Feldman et al. ............. 382/128 |
| 6,580,818 | B2 * | 6/2003 | Karssemeijer et al. ....... 382/128 |
| 6,813,374 | B1 * | 11/2004 | Karimi et al. ................. 382/131 |
| 7,260,252 | B2 * | 8/2007 | Fujisawa ....................... 382/131 |
| 7,508,967 | B2 * | 3/2009 | Harari et al. .................. 382/128 |

FOREIGN PATENT DOCUMENTS

EP           0899693 A2       3/1999
(Continued)

OTHER PUBLICATIONS

International Preliminary Report on Patentability in connection with PCT/JP2006/308622.

(Continued)

*Primary Examiner* — Phillip A Johnston
(74) *Attorney, Agent, or Firm* — Cooper & Dunham LLP

(57) ABSTRACT

An image display apparatus according to the invention comprises reading section (11a) which reads in an image data set of a subject acquired by a medical imaging apparatus (2) from a data recording device (13) which stores the image data set; input sections (16, 17) which input a desired object organ to the read-in image data set; object organ extracting section (11b) which extracts the inputted object organ; reference position setting section (11h) which sets a reference position for producing an unfolded image in the circumferential direction of the bore of the extracted object organ; calculating device (11e) which calculates pixel information in the circumferential direction of the bore of the object organ from the set reference position; and image display section (15) which displays the calculated pixel information in the circumferential direction of the bore of the object organ.

15 Claims, 33 Drawing Sheets

FOREIGN PATENT DOCUMENTS

| | | |
|---|---|---|
| JP | 11-56832 | 3/1999 |
| JP | 11-318884 | 11/1999 |
| JP | 2002-92590 | 3/2002 |

OTHER PUBLICATIONS

Sep. 13, 2011 Japanese official action in connection with a counterpart Japanese patent application.

* cited by examiner

POINT AT INFINITY

VIEWING DIRECTION

NUMBER OF PIXEL VALUES IN THRESHOLD RANGE CONVERTED
INTO SHADOW VALUES

FGI.36

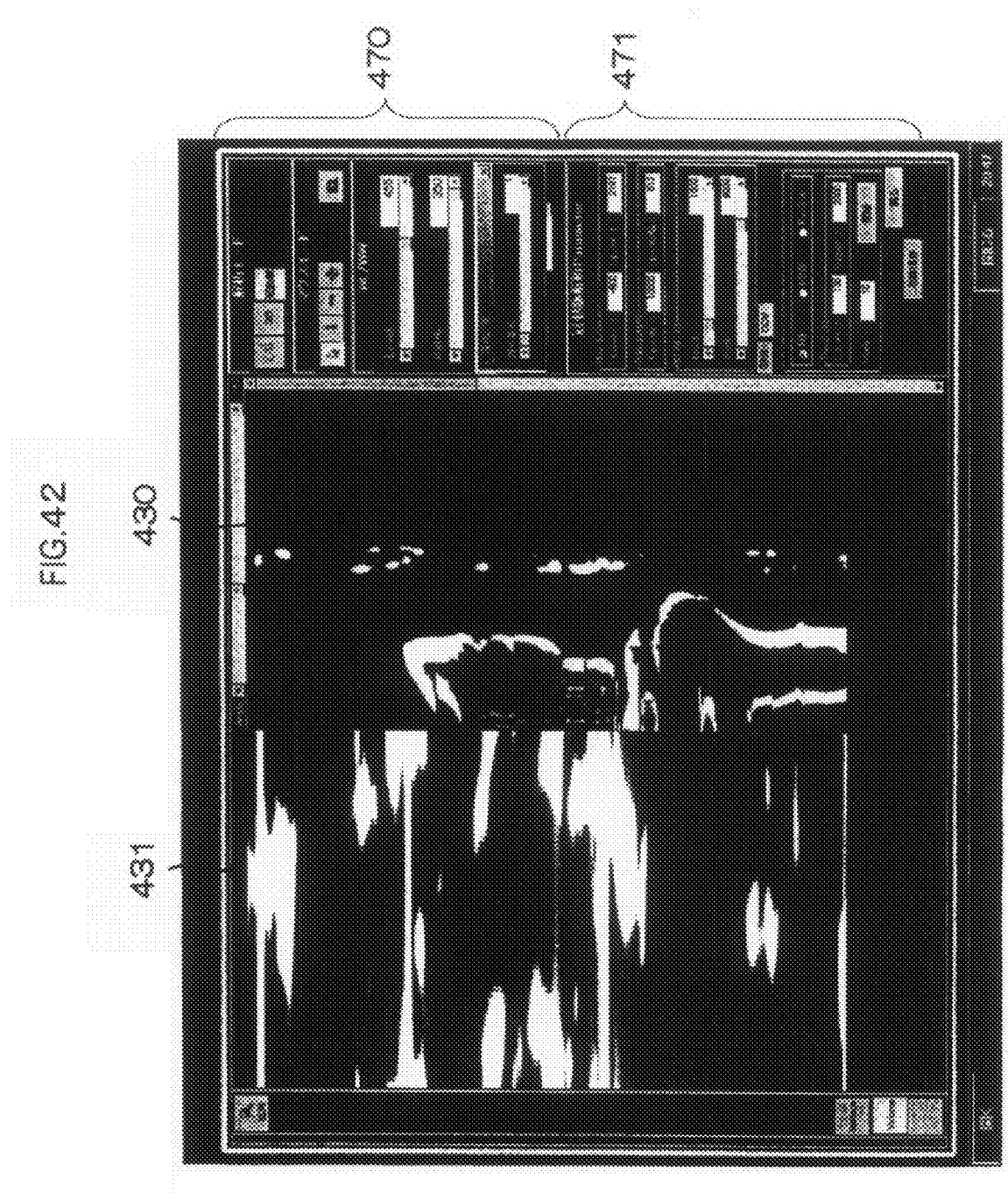

IMAGE DISPLAY APPARATUS AND PROGRAM

TECHNICAL FIELD

The present invention relates to a technique to efficiently support diagnoses of object organs of a subject, such as blood vessels, bronchus and intestines, in the subject's medical images including tomograms obtained from a medical imaging apparatus such as an X-ray CT apparatus, X-ray apparatus, MRI apparatus or ultrasound diagnostic apparatus.

The present application claims Paris convention priority based on Patent Applications Nos. 2005-132401, 2005-147214 and 2005-259817 under the Patent Law of Japan. This application benefits from Patent Applications Nos. 2005-132401, 2005-147214 and 2005-259817, which are incorporated by reference.

BACKGROUND ART

Today, diagnoses by medical imaging are accomplished by displaying object organs such as blood vessels and bronchus in three-dimensional medical images obtained from a medical imaging apparatus and reading the displayed images of the three-dimensional medical images with respect to any matter sticking to the organs or the like. The matter sticking in this context may be plaques, thrombi, polyps or calcification. For instance, Patent Document 1 discloses a technique to display a curved tomogram along the center line of an object organ to enable the interior of the object organ to be observed. This displaying technique visualizes density information of a tomogram along the center line linking the centers of the area farther inside than the inner wall of the object organ. This visualization makes possible the following image diagnoses of the object organ. These image diagnoses make possible, for instance, measurement of the blood vessel diameter and the degree of its stricture and the discovery of a polyp in the large intestine without using an intestinal camera.

Patent Document 1: Japanese Patent Application Laid-Open No. 11-318884

According to Patent Document 1, since tomograms along the center line of an object organ are obtained, displaying of a single tomogram enables only the presence of any matter sticking to an object organ to be recognized. Therefore, in order for a physician to confirm the state of the disease due to sticking matter and to plan the policy of therapy, he has to obtain a plurality of tomograms, display them in the sequence of their being picked up and observe how extensively the stuck matter is spread over the object organ. Preparation of the plurality of tomograms requires setting of complex parameters for each individual tomogram. Moreover, in this diagnosis by the doctor, the doctor reads the prepared plurality of tomograms, estimates the spread of the stuck matter over the object organ relying on his own anatomical knowledge, and gives a diagnosis. Thus, Patent Document 1 reflects no consideration for the possibility to enable the state of the sticking matter to the object organ to be observed at a glance.

BRIEF SUMMARY

In an aspect of this disclosure, there is provided an image display apparatus which makes possible observation of the state of the matter sticking to the object organ at a glance, and a program therefor.

In another aspect, there is provided an image display apparatus that comprises a device (11a) which reads in an image data set of a subject acquired by a medical imaging apparatus (2) from a data recording device (13) which stores the image data set; an input device (16, 17) which inputs a desired object organ to the read-in image data set; an object organ extracting device (11b) which extracts the inputted object organ; a reference position setting device (11h) which sets a reference position for producing an unfolded image in the circumferential direction of the bore of the extracted object organ; a calculating device (11e) which calculates pixel information in the circumferential direction of the bore of the object organ from the reference position; and an image display device (15) which displays pixel information in the circumferential direction of the bore of the calculated object organ.

In another aspect, there is provided an image display program that causes a computer to execute a step (S101) of reading in an image data set of a subject acquired by a medical imaging apparatus (2) from a data recording device (13) which stores the image data set; an input step (S103) of inputting a desired object organ to the read-in image data set; an object organ extracting step (S104) of extracting the inputted object organ; a reference position setting step (S106) of setting a reference position for producing an unfolded image in the circumferential direction of the bore of the extracted object organ; and an image displaying step (S111) of displaying pixel information in the circumferential direction of the bore of the calculated object organ.

Thus, the state of any sticking matter to the inside of an object organ can be observed at a glance.

BRIEF DESCRIPTION OF THE DRAWINGS

FIG. 42 shows an example of actually displaying in parallel an unfolded map and a CPR image.

DESCRIPTION OF SYMBOLS

1 ... image display system, 2 ... medical imaging apparatus, 3 ... image database, 4 ... network, 10 ... image display apparatus, 11 ... CPU, 12 ... main memory, 13 ... data storage device, 14 ... display memory, 15 ... display, 16 ... mouse, 16a ... controller, 17 ... keyboard, 18 ... network adapter, 19 ... data bus

BEST MODE FOR CARRYING OUT THE INVENTION

An image display apparatus and a program therefor in preferred modes for carrying out the present invention will be described in detail below with reference to accompanying drawings.

Hardware Configuration

Figure 1:
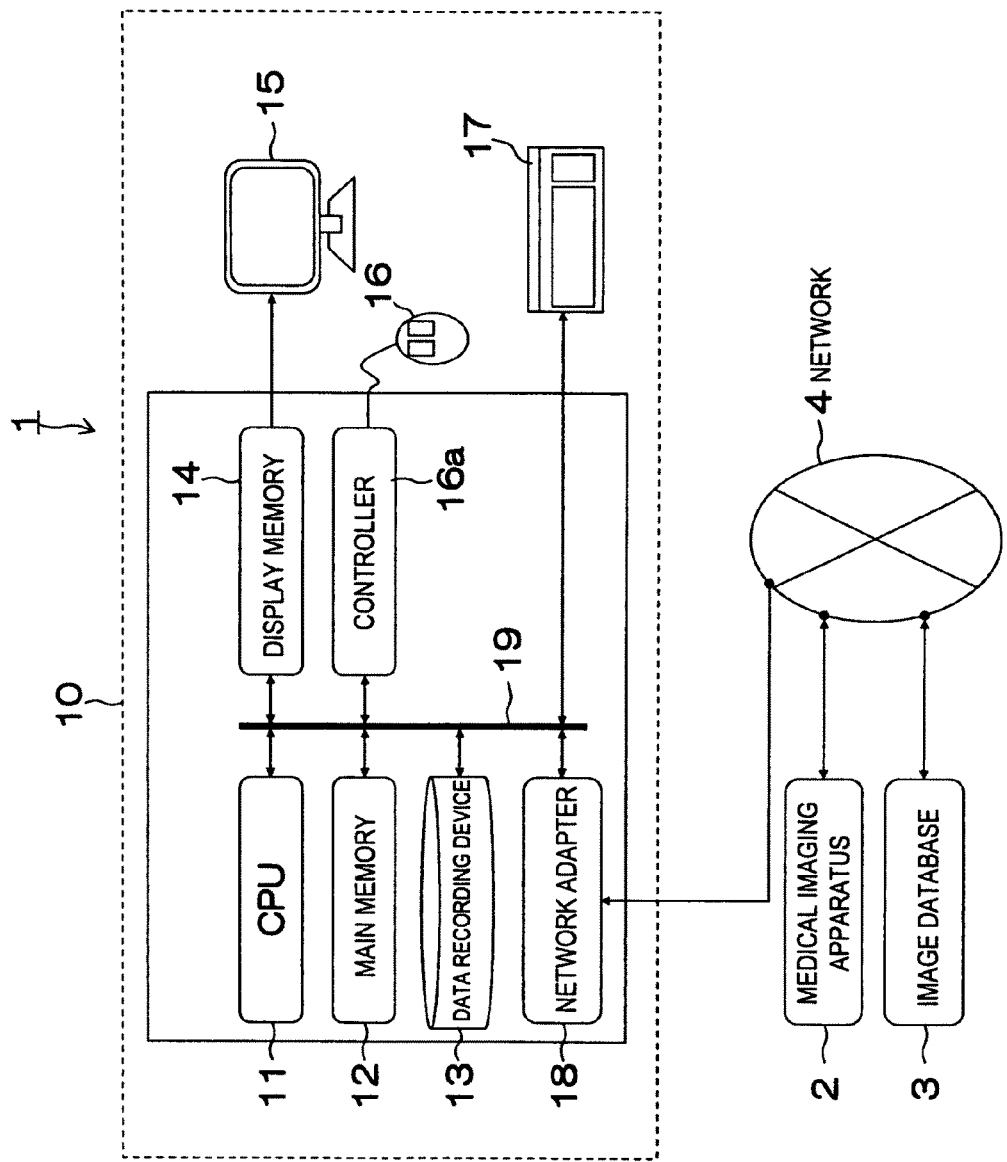
FIG. 1 shows the configuration of hardware according to the invention.

FIG. 1 shows a schematic configuration of an image display system using an image display program, apparatus and method in a mode for implementing the invention. An image display system 1 is constituted by mutually connecting a medical imaging apparatus 2, an image database 3 and an image display apparatus 10 via a network 4 such as an in-house LAN.

The medical imaging apparatus 2 picks up medical images of a subject from a CT apparatus, an X-ray apparatus, an MRI apparatus or an ultrasound diagnostic apparatus. The image database 3 stores images picked up by the medical imaging apparatus 2 to be searchable subsequently under prescribed searching conditions.

In the image display apparatus 10, a central processing unit (CPU) 11, a main memory 12, a data recording device 13, a display memory 14, a controller 16a, a keyboard 17 and a network adapter 18 are connected by a data bus 19.

The CPU 11 mainly controls the actions of the constituent elements. The main memory 12 reads out control programs and image data for the image display system to serve as a work area. Various sets of application software for the image display system including control programs and image display programs and image data on the subject are stored in the data recording device 13. The display memory 14, connected to a display 15, temporarily stores data to be displayed. The display 15 displays an image on the basis of image data from the display memory 14. A pointing device 16 is a mouse, track ball, touch panel or the like for operating software switches on the display 15. A mouse is mainly used as the pointing device here. The controller 16a, connected to the pointing device 16, communicates the encoding quantity and click information of the pointing device to the CPU 11 via the data bus 19. The keyboard 17, equipped with keys and switches for setting various parameters, communicates the input quantities of the keys and switches to the CPU 11 via the data bus 19. The network adapter 18 connects the image display system to the network 4 such as a local area network, telephone line or the Internet to make possible data communication to and from outside the system. The data recording device 13 is formed or a memory built into or externally fitted to the image display system 1, a storage device such as a magnetic disk or a device which writes or reads data into or out of an extractable external medium. The image display apparatus 10, connected to the medical imaging apparatus 2 and the image database 3 outside via the network adapter 18 and the network 4, transmits and receives image data to and from them.

First Embodiment

Figure 2:
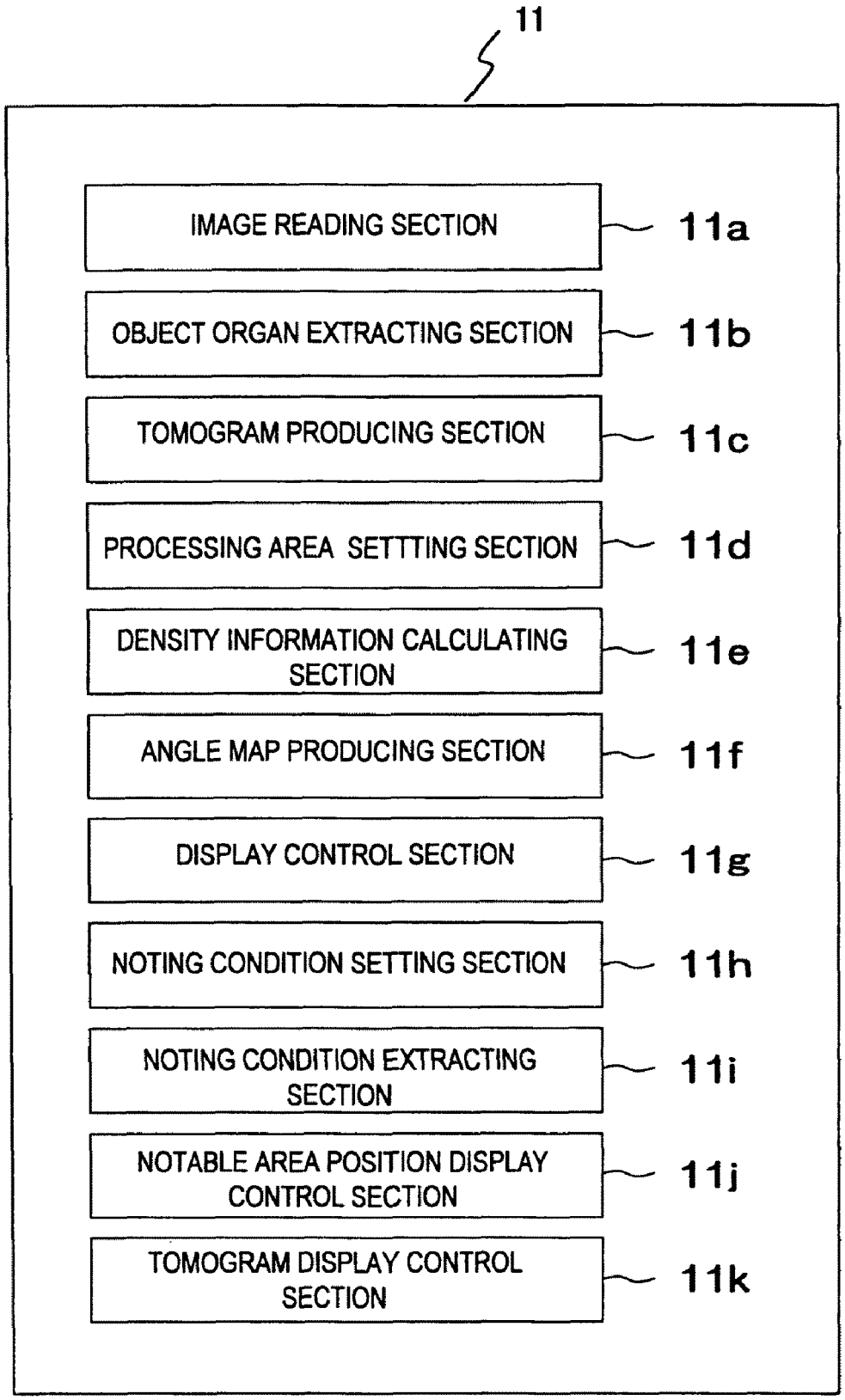
FIG. 2 is a program block diagram in a first embodiment.

Next, a program executed by the CPU 11 of the image display apparatus 10 will be described with reference to FIG. 2. FIG. 2 is a block diagram showing the configuration of the program as divided into functional sections.

First, the basic configuration of the program comprises an object organ extracting section 11b which extracts an inputted object organ, a reference position setting section 11h which sets the reference position for producing an image unfolded in the circumferential direction of the bore of the extracted object organ, a density information calculating section 11e which calculates at prescribed intervals density information in the circumferential direction of the bore of the object organ from the set reference position, and a tomogram display control section 11k which displays on the display 15 the density information in the circumferential direction of the bore of the object organ calculated at the prescribed intervals.

In a further detailed configuration, the CPU 11 executes an image reading section 11a, the object organ extracting section 11b, a tomogram producing section 11c, a processing area setting section 11d, the density information calculating section 11e, an angle map producing section 11f, a display control section 11g, a noting condition setting section 11h, a noting condition extracting section 11i, a notable area position display control section 11j and the tomogram display control section 11k, which together constitute a program.

The image reading section 11a reads image data (which may be an image data set comprising a plurality of sheets of image data) from the image database 3 and the data recording device 13 or the medical imaging apparatus 2.

The object organ extracting section 11b accepts setting of the area to be processed out of the image data or the image data set having been read in. The object organ extracting section 11b extracts an object organ included in the organ to be processed, such as a tubular organ area which may be a blood vessel, bronchus or intestine.

The tomogram producing section 11c produces a desired tomogram in the tubular organ area extracted by the object organ extracting section 11b. In this embodiment, the tomogram producing section 11c produces multiplanar reconstruction (MPR) images orthogonal to the center line of tubular organ.

The processing area setting section 11d sets the processing area from which density information is to be calculated out of the object organ area contained in each of the MPR images produced by the tomogram producing section 11c. More specifically, the processing area setting section 11d extracts the object organ area contained in each MPR image, and next the processing area setting section 11d calculates the coordinates of the center of gravity of the extracted object organ area. Then, the processing area setting section 11d sets the area in a prescribed range with reference to the coordinates of the center of gravity as the processing area in which density information is to be calculated.

The density information calculating section 11e calculates density information on the processing area set by the processing area setting section 11d. The method of calculating density information, for instance, may be to calculate density information on pixels oriented in the directions from the center of gravity toward the peripheral lines of the object organ (in the radial directions) or to calculate a set of density information representative of the radial directions out of the sets of density information on the pixels in the radial directions.

The angle map producing section 11f produces an angle map by mapping density information in the processing area along angles.

The display control section 11g performs display control to display images on the display 15, and in this embodiment performs display control of angle maps.

The noting condition setting section 11h sets conditions, including the CT value for instance, for designating the notable area, such as a soft plaque.

The noting condition extracting section 11i extracts pixels matching the noting conditions out of an angle map. The notable area position display control section 11j performs control to display the positions of the pixels matching the noting conditions in the angle map.

The tomogram display control section 11k, when any set of coordinates are designated on the angle map, performs control to display an MPR image corresponding to the coordinates and eventually to display density information in the circumferential direction of the bore of the object organ.

These noting condition setting section 11h, noting condition extracting section 11i, notable area position display control section 11j and tomogram display control section 11k are not indispensable constituent elements in the first embodiment, but are required in a second embodiment.

These programs are stored in the data recording device 13, and read out to the main memory 12 by the CPU 11 for execution.

Figure 3:
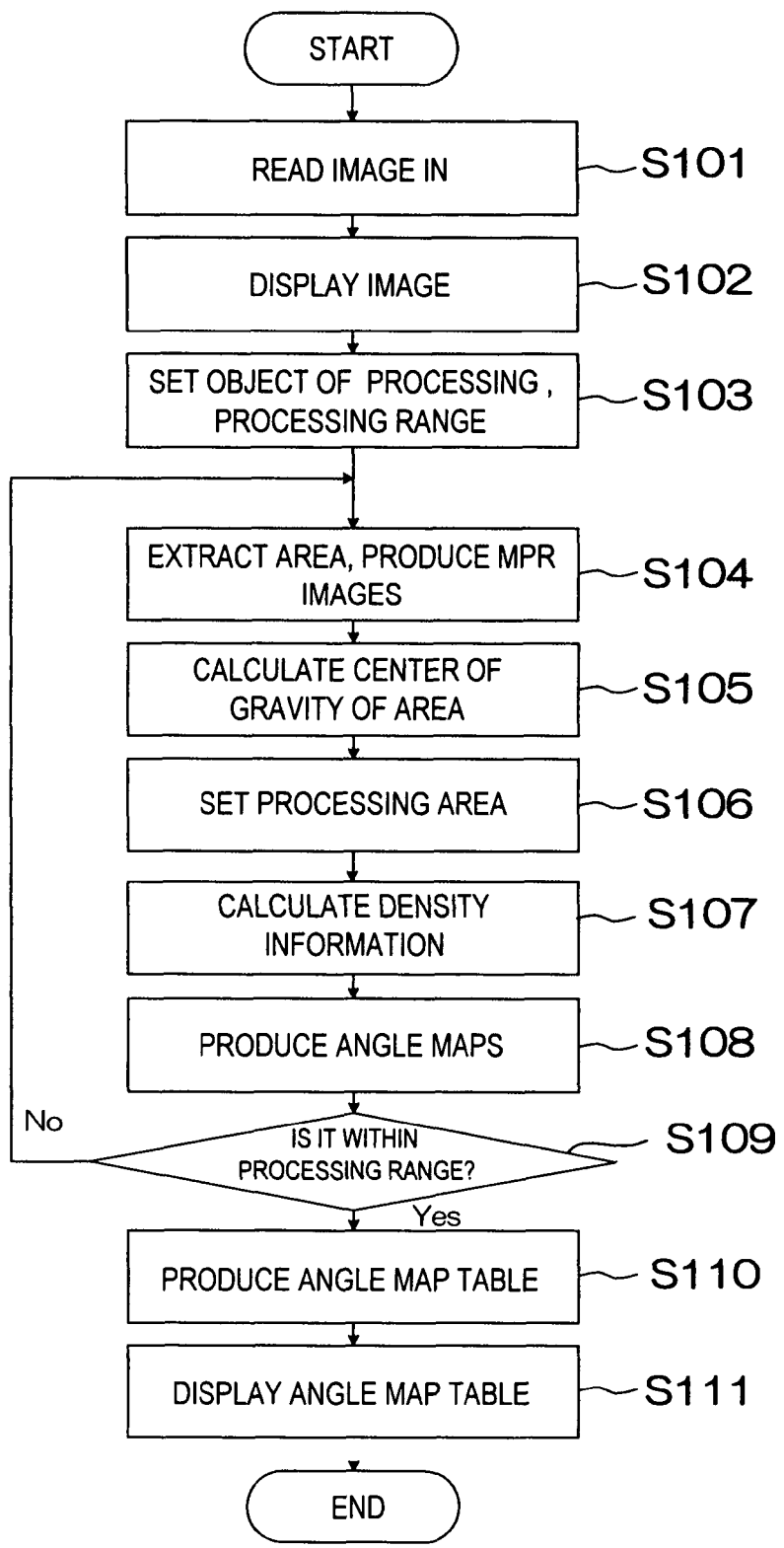
FIG. 3 is a flow chart of the flow of processing in the first embodiment.

Next, processing by which an angle map illustrating density information within a tubular organ is displayed by the image display system 1 configured as stated above will be described with reference to FIG. 3. FIG. 3 is a flow chart showing the flow of processing to display an angle map. The CPU 11 controls the image display system following this flow chart.

(Step S101)

At S101, the image reading section 11a reads an image in (S101). A medical image data set of the subject picked up by the medical imaging apparatus 2 is read out of the data recording device 13 or the image database 3 and loaded into the main memory 12. The "image data set" here refers to hundreds of tomograms picked up of the subject.

(Step S102)

Figure 4:
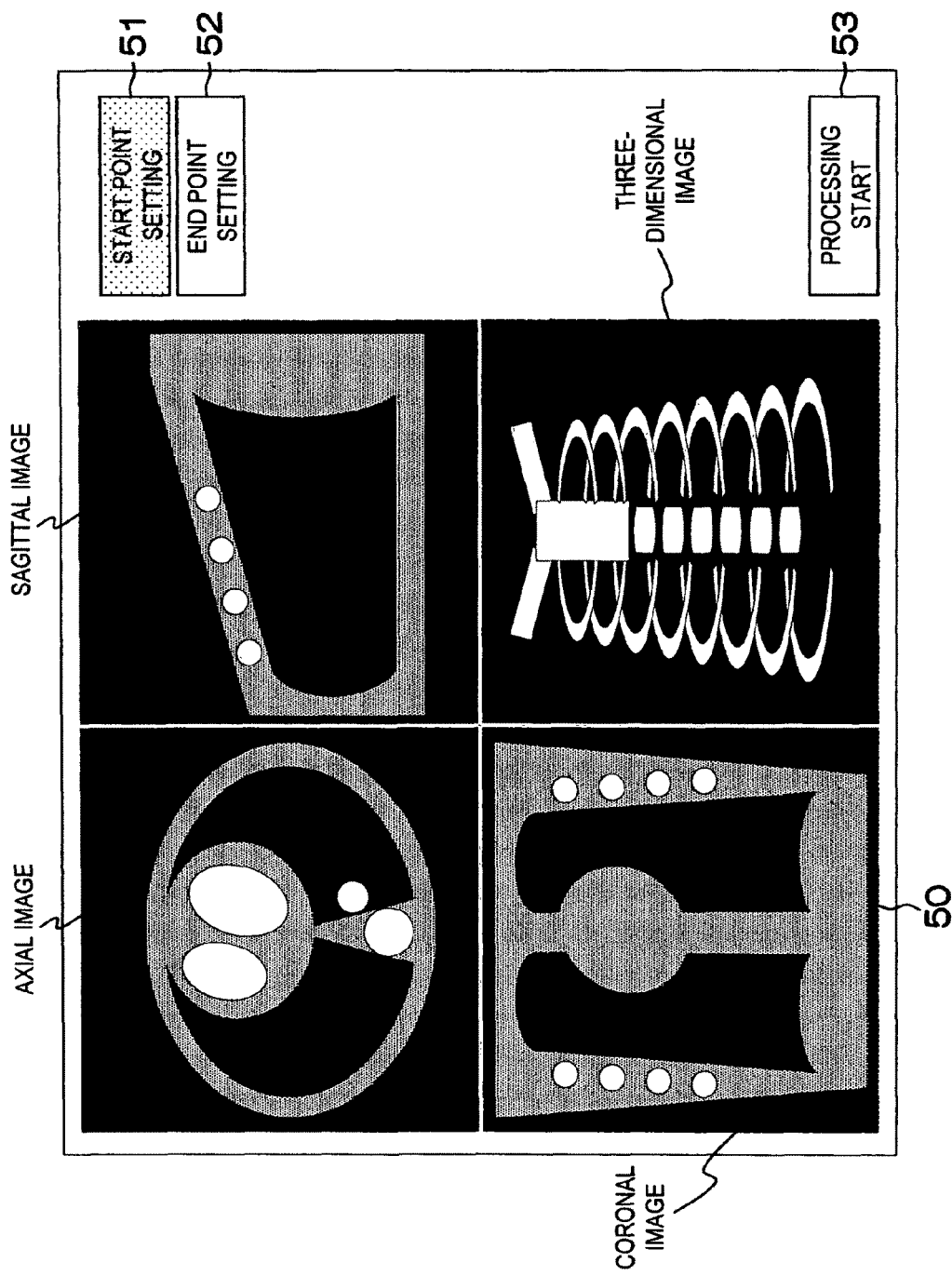
FIG. 4 shows an example of displaying a medical image data set obtained by a medical imaging apparatus and an example of screen to set the processing range.

At S102, the CPU 11 displays on the display 15 the image data set developed in the main memory 12 (S102). The image to be displayed is an axial image, a sagittal image, a coronal image, or a three-dimensional image produced from the image data set, such as a volume rendering image or a surface rendering image. Examples of image display are shown in FIG. 4; the layout of at least one of the images and their combination are not limited to these. The same is true of other image displays including MPR images.

(Step S103)

At S103, the tubular organ to be processed is designated and the processing range is set (S103).

FIG. 4 is a schematic diagram showing an example of screen displayed at this step. The screen of FIG. 4 shows an image display area 50 in which tomograms including an axial image, a sagittal image, a coronal image, and a three-dimensional image produced from the image data set such as a volume rendering image or a surface rendering image, and software buttons including a "start point setting" button 51, an "end point setting" button 52 and a "processing start" button 53 for designating the start point and end point of processing are displayed. The start point and end point in this context respectively refer to the starting section and the ending section of the range in which the subsequent processing is to be performed.

When the operator clicks the "start point setting" button 51 with a mouse 16 and further clicks the mouse 16 on the displayed image, the clicked position is set as the start point. Similarly, when he clicks the "end point setting" button 52 with the mouse 16 and further clicks the mouse on the displayed image, the clicked position is set as the end point. The start point and the end point so set are stored as three-dimensional coordinates. Setting of the start point also serves as the setting of the tubular organ to be processed. When the end point is not to be designated in particular, the whole range in which the tubular organ can be extracted on the basis of the start point may be considered the processing range.

Figure 5:
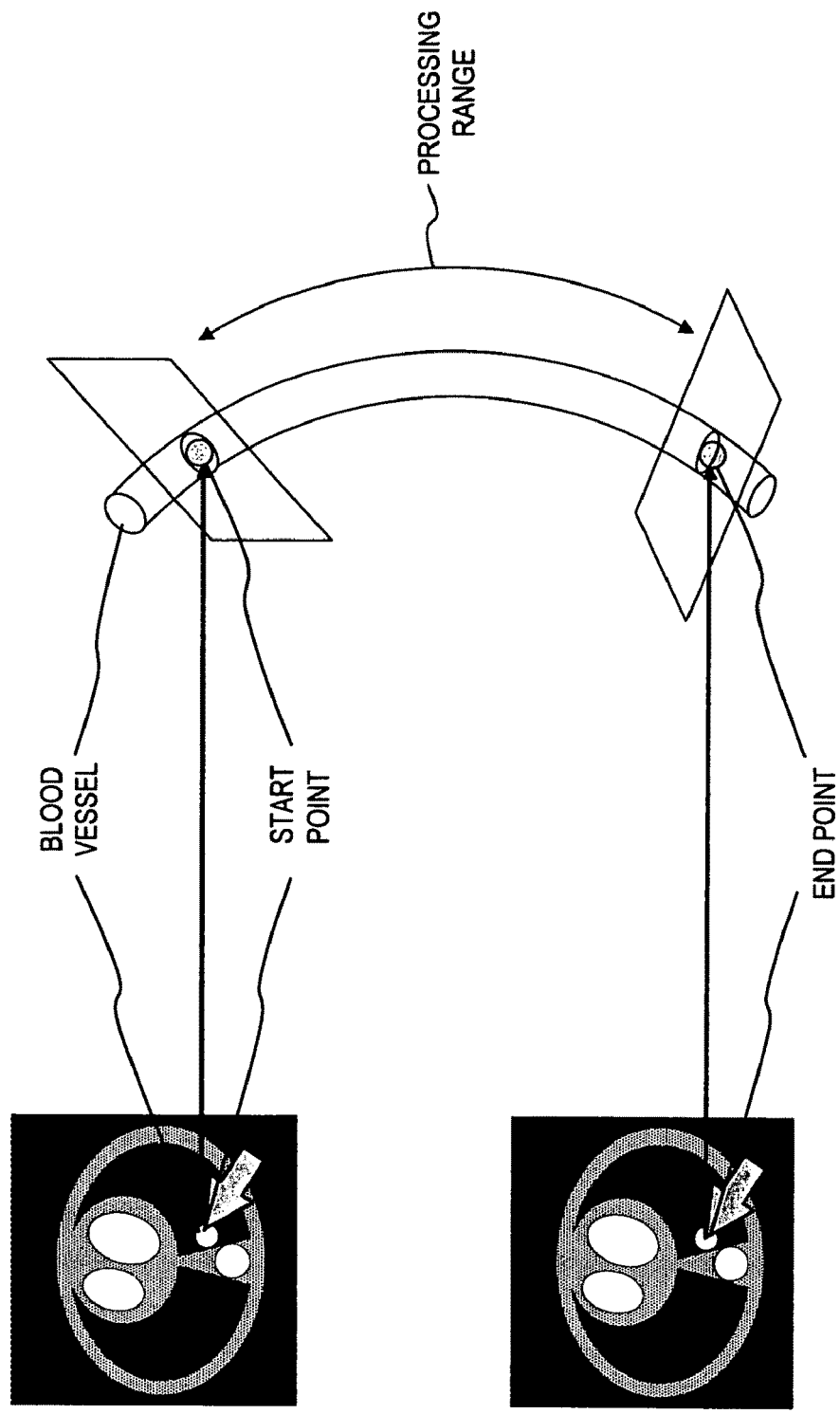
FIG. 5 is a schematic diagram illustrating the processing range set.

FIG. 5 is a schematic diagram showing the processing range set in this way. When the start point and the end point are set on a tomogram (e.g. an axial image) displayed in the image display area 50 of FIG. 4, the range from the section containing the start point to the section containing the end point along the tubular organ is set as the processing range.

(Step S104)

At S104, a tubular organ area is extracted out of the processing range of the image data set by the object organ extracting section 11b at S103. The tomogram producing section 11c calculates the center line of the tubular organ area, and produces an MPR image orthogonal to the center line (S104). The tomogram producing section 11c extracts the tubular organ area and produces the MPR image orthogonal to the center line of the tubular organ as shown in FIG. 5 for the range from the start point to the end point set at S103. A plurality of MPR images are produced at prescribed intervals in the direction of the center line of the extracted tubular organ. One of the methods to calculate the center line (the axis representing the running direction) of a blood vessel, for instance, is to thin the blood vessel to use the resultant skeleton information. The coordinate information on the axis (the center line) thereby obtained may involve calculation errors, errors dependent on the distortion of the sectional shape or errors due to the failure to maintain the circularity of the lumen. For this reason, error reduction processing, such as exception removal or smoothing of coordinate values based on the circular approximation or curvature of the lumen may be added.

(Step S105)

At S105, the center of gravity of the tubular organ area within each of the MPR images produced by the processing area setting section 11d at S104 is figured out (S105).

The method to figure out the center of gravity may use, for instance, coordinate averages represented by Equations 1. The coordinates of the center of gravity being represented by G (gx, gy) and those of the extracted tubular organ area by R (rx, ry), they can be obtained by Equations 1.

$$gx = \frac{\sum_{i=0}^{n} rx_i}{n} \quad gy = \frac{\sum_{i=0}^{n} ry_i}{n}$$ [Equations 1]

Here, n is the number of pixels in the tubular organ area.

(Step S106)

The processing area setting section 11d sets the processing area which in a density value is figured out for each tomogram on the basis of the center of gravity coordinates calculated at S105 (S106).

Figure 6:
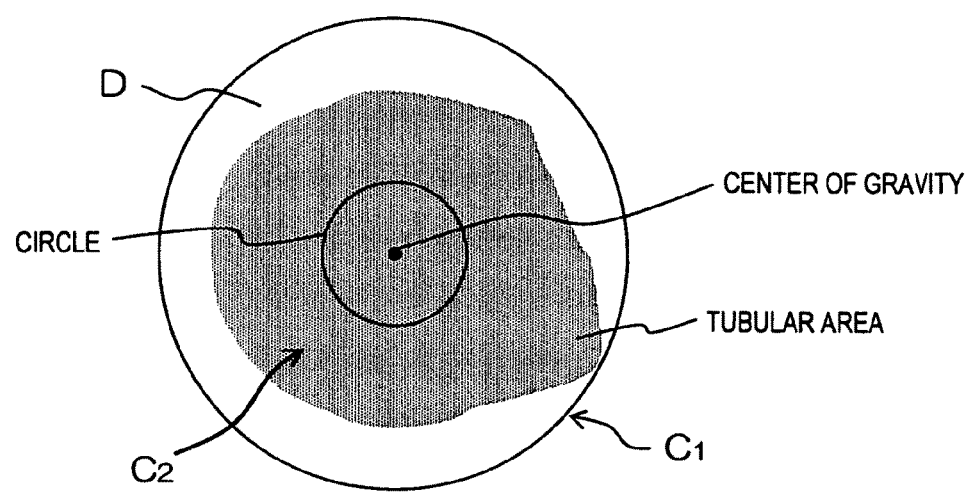
FIG. 6 is a schematic diagram illustrating the method of setting a processing area D to be set in a tubular organ and the processing area.

In this embodiment, a circle containing the whole tubular organ area is set as the processing area. In each tomogram, a hollow area having a thickness in the radial direction near the inner wall of the blood vessel is figured out as a processing area D. More specifically, as shown in FIG. 6, the hollow area D (the area surrounded by the outer circumference C1 and the inner circumference C2) which covers the whole periphery of the tubular area around the center of gravity is defined. Specific examples of method to calculate the processing area shown in FIG. 6 will be cited below.

(1) A circle is drawn around the center of gravity as shown in FIG. 6, and pixel values on the circumference are checked.

Figure 7:
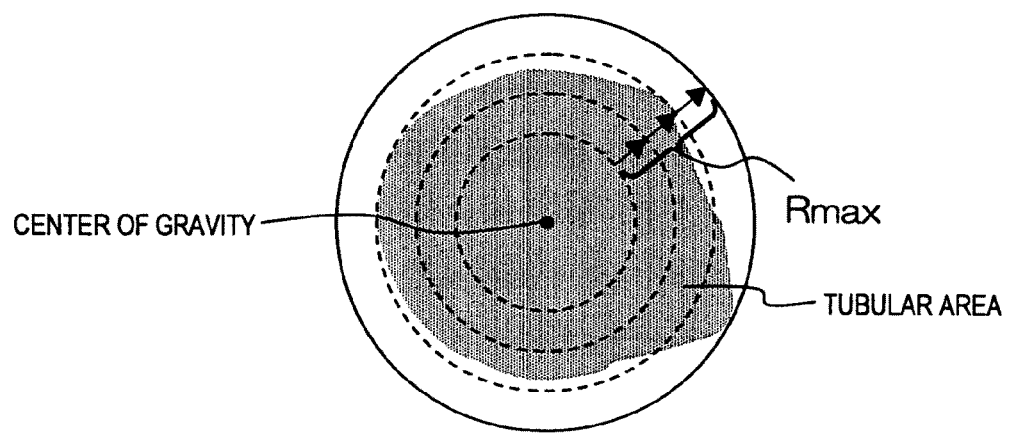
FIG. 7 is a schematic diagram illustrating a method of setting the processing area.

(2) The circle is expanded by one pixel at a time until there is no longer any pixel in the tubular area on the circumference are gone as shown in FIG. 7, and the radius Rmax at the time is figured out.

Figure 8:
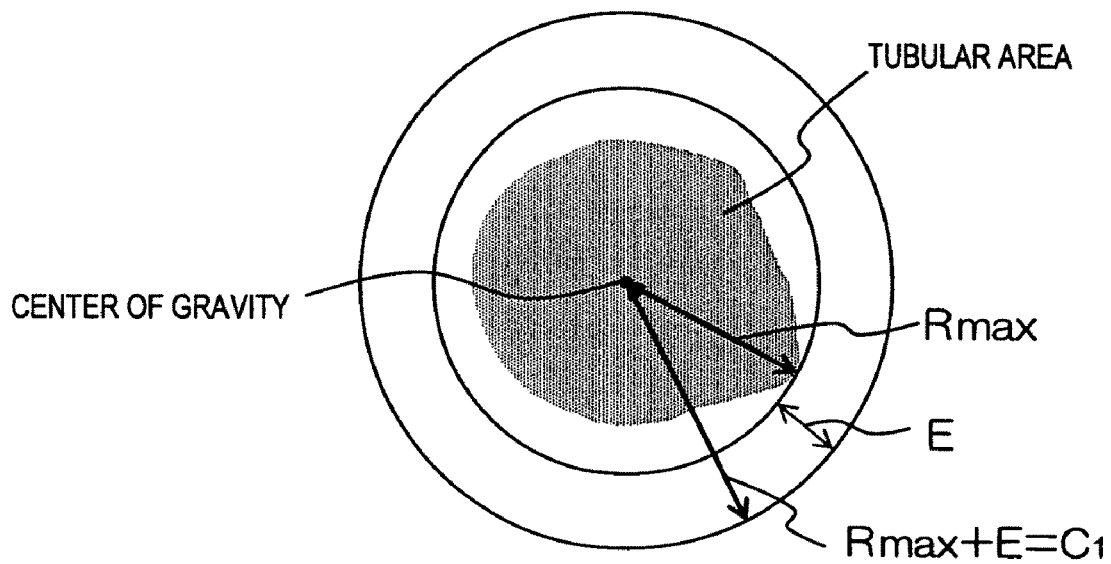
FIG. 8 is a schematic diagram illustrating another method of setting the processing area.

(3) A circle whose radius is the number of pixels which is the sum of the radius Rmax figured out by (2) above plus a constant value E and whose center is the center of gravity is drawn as shown in FIG. 8. This circle corresponds to the outer circumference $C_1$ in FIG. 6.

Figure 9:
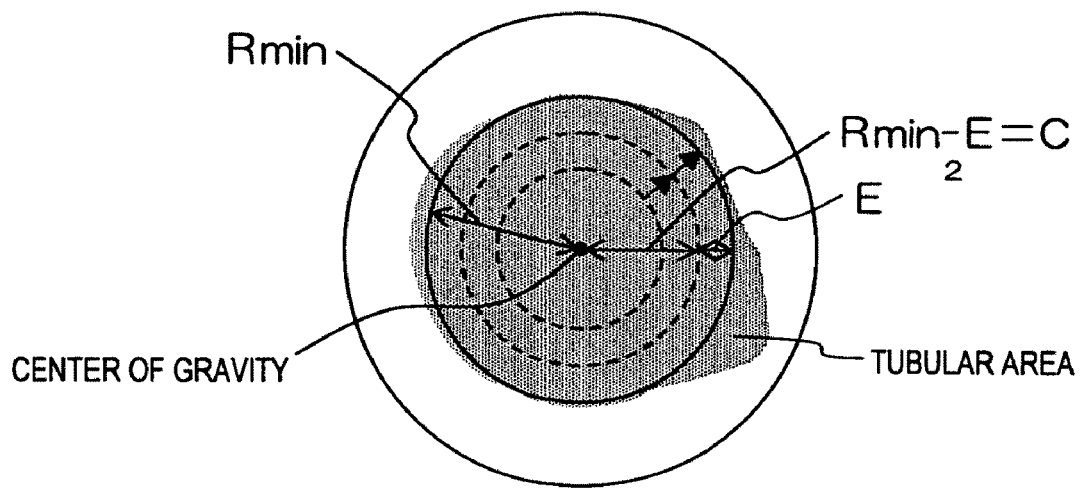
FIG. 9 is a schematic diagram illustrating another method of setting the processing area.

(4) The minimum radius Rmin at which any pixel, even one, outside the tubular area is present on the circumference as shown in FIG. 9 is figured out.

(5) A circle whose radius is the number of pixels which is the number of pixels which is the balance of the minimum radius Rmin figured out by (4) above minus the constant value E and whose center is the center of gravity is drawn as shown in FIG. 9. This circle corresponds to the inner circumference $C_2$ in FIG. 6. The constant value E may either be a predetermined fixed value (e.g. +5 pixels or −5 pixels) or a variable derived from Rmax or Rmin (e.g. +5% pixel or −5% pixel). The hollow area D from the outer circumference $C_1$ to the inner circumference $C_2$ is supposed to constitute the processing area.

(Step S107)

At S107, the density information calculating section 11e calculates in the radial direction from the center of gravity of the tubular organ area the density information representing that radial direction. The "density information representing that radial direction" here is a value obtained from the density values of pixels arrayed in the radial direction; for instance, the density value V(θ) of each angle is figured out by using a known image processing technique such as maximum value projection, minimum value projection or addition averaging.

Figure 10:
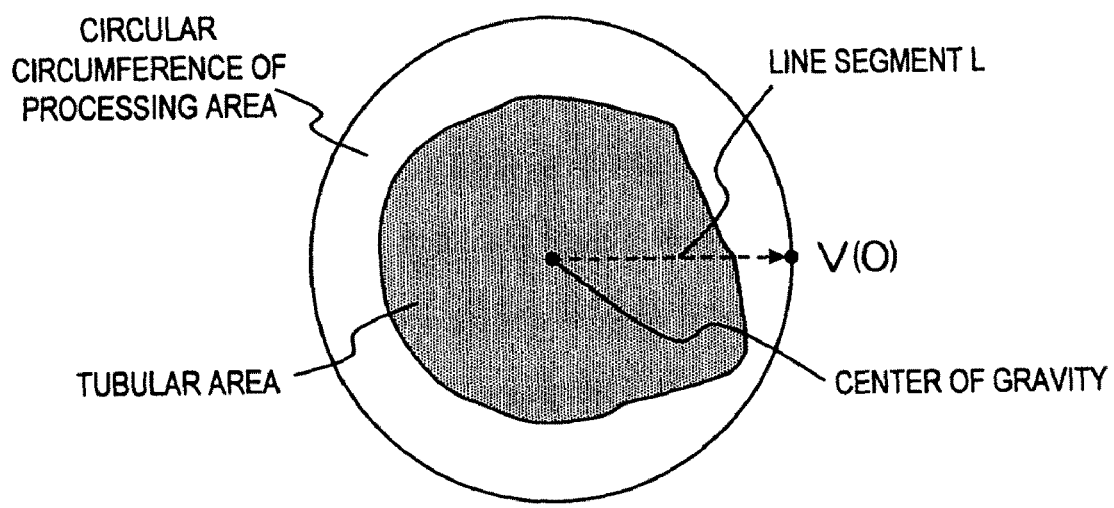
FIG. 10 is a schematic diagram illustrating a method of calculating density information.
Figure 11:
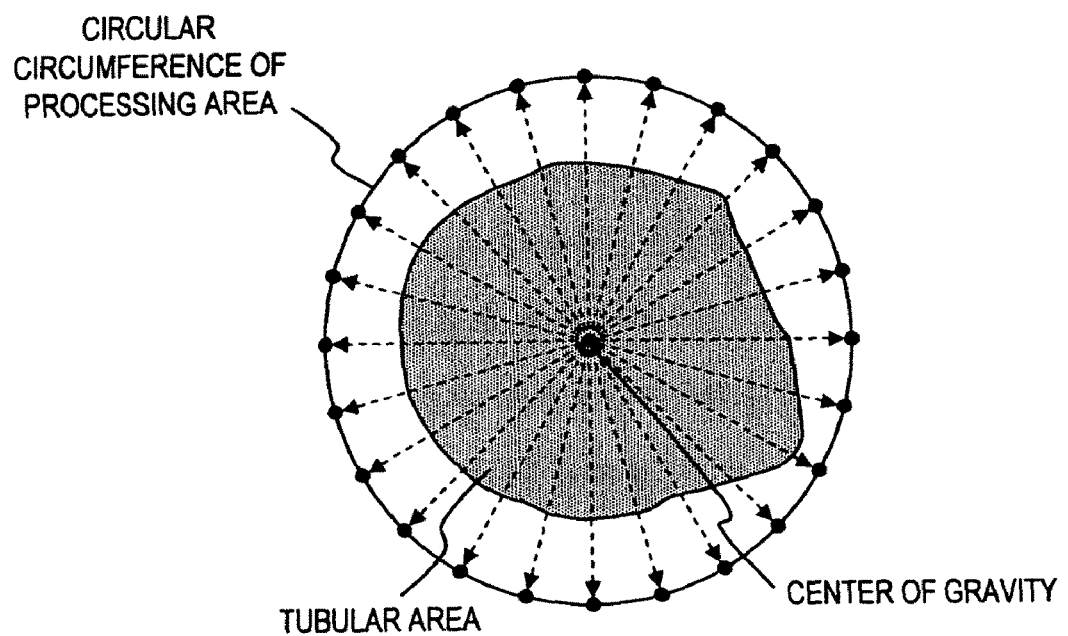
FIG. 11 is a schematic diagram illustrating the method of calculating density information.

FIG. 10 schematically shows how an angle map is produced. Where the processing area contains the whole tubular organ area for instance, the angle rightward from the center of gravity being supposed to be 0 degree, V(0) is obtained as density information resulting from subjecting pixels on a line segment L extended in a direction at 0 degree from the center of gravity to the circular circumference of the processing area to image processing such as maximum value projection, minimum value projection or addition averaging. This is accomplished at the intervals of a regular angle as shown in FIG. 11. The angular intervals at which the density information may be either fixed values such as 1° angles or 10° intervals, or values designated by the observer. Incidentally, when density information only within the tubular organ is to be figured out, pixel values in the area other than the tubular organ area are reduced to 0 by threshold processing or otherwise before producing the angle map. This enables density information in the radial direction to be calculated on the basis of pixel values only in the tubular organ area. Where the tubular organ to be processed is a contrast-increased blood vessel or some other like case, as the contrastive area has much density information, the pixel values of other elements than the contrast medium are not reflected by maximum projection. In such a case, the pixel values of the contrast-increased area are reduced to 0 in advance by threshold processing or otherwise. Further, the tubular organ is a thin blood vessel such as the coronary artery, the radius from the center of gravity to the periphery is short, and accordingly sufficient density information may be unavailable. In such a case, the tubular organ area extracted before the angle map was produced is expanded by a known method, such as zooming reconstruction, to enable sufficient density information to be obtained.

(Step S108)

Figure 12:
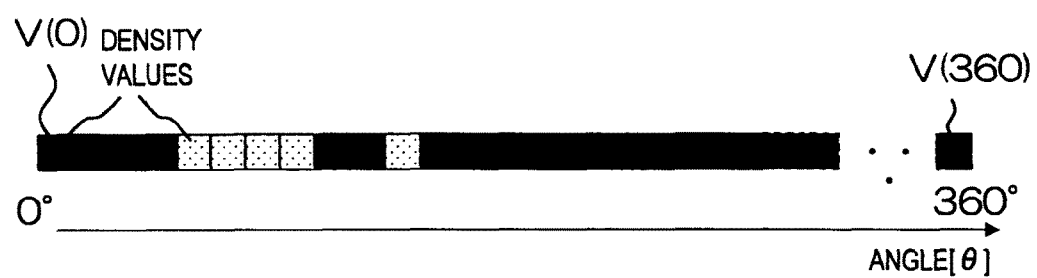
FIG. 12 is a schematic diagram illustrating a method of producing an angle map.

At S108, the angle map producing section 11f produces column data in which density values are arrayed to 360 degrees from a certain angular direction which is supposed to be 0 degree (S108). These column data are referred to as an angle map here. The angle map producing section 11*f* arranges sets of density information differentiated by angle as shown in FIG. 12 to produce the column data.

(Step S109)

The angle map producing section 11*f* determines whether or not the processing from steps S104 through S107 has been completed to an extent where a section or a tubular organ area containing the end point set at step S103 can be extracted (S109). If the end point is not reached, the processing returns to step S104, MPR images of the next region in the tubular organ area are produced, processing from S105 through S107 is performed and the angle map of each MPR image is produced. If the end point is surpassed or there is no more area that can be extracted as a tubular organ area, the processing transfers to S110. Incidentally, though the angle map producing section 11*f* determines in the foregoing whether or not the processing set at step S103 has been completed, this determination may as well be made by the density information calculating section 11*e*, or a determining section to make this determination may well be separately provided.

(Step S110)

Figure 13:
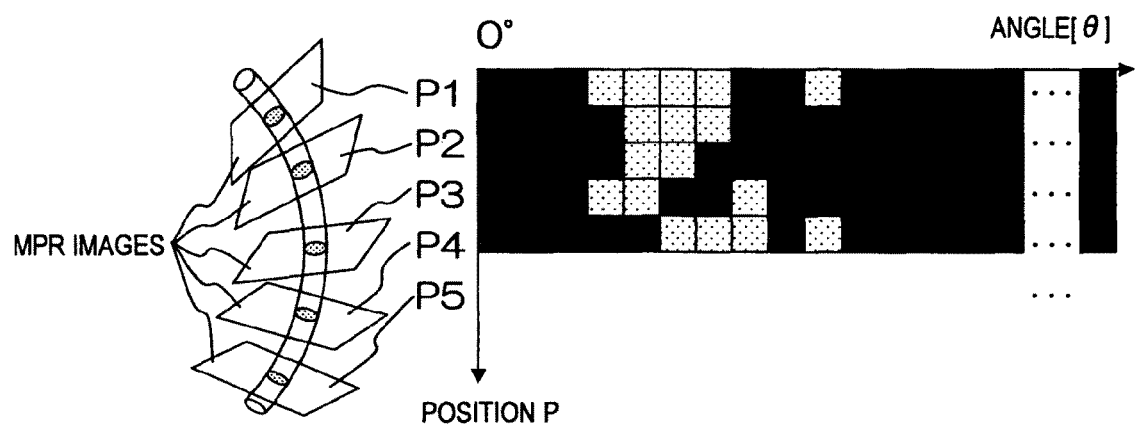
FIG. 13 is a schematic diagram illustrating the method of producing and defining an angle map table.

At S110, the angle map producing section 11*f* produces an angle map table (S110). The angle map table is defined as coordinates of which the vertical axis is a positional axis indicating positions in the center line direction of the tubular organ and the horizontal axis is an angular axis indicating angles around the center of gravity. The angle map producing section 11*f* produces the angle map table by stacking the angle maps of MPR images produced at S108 in the sequence of the sectional positions in the center line direction (running direction) of the tubular organ. FIG. 13 shows an example of angle map table. The MPR images are stacked in the sequence of production, P1, P2, P3, P4, P5 and so forth.

(Step S111)

Figure 14:
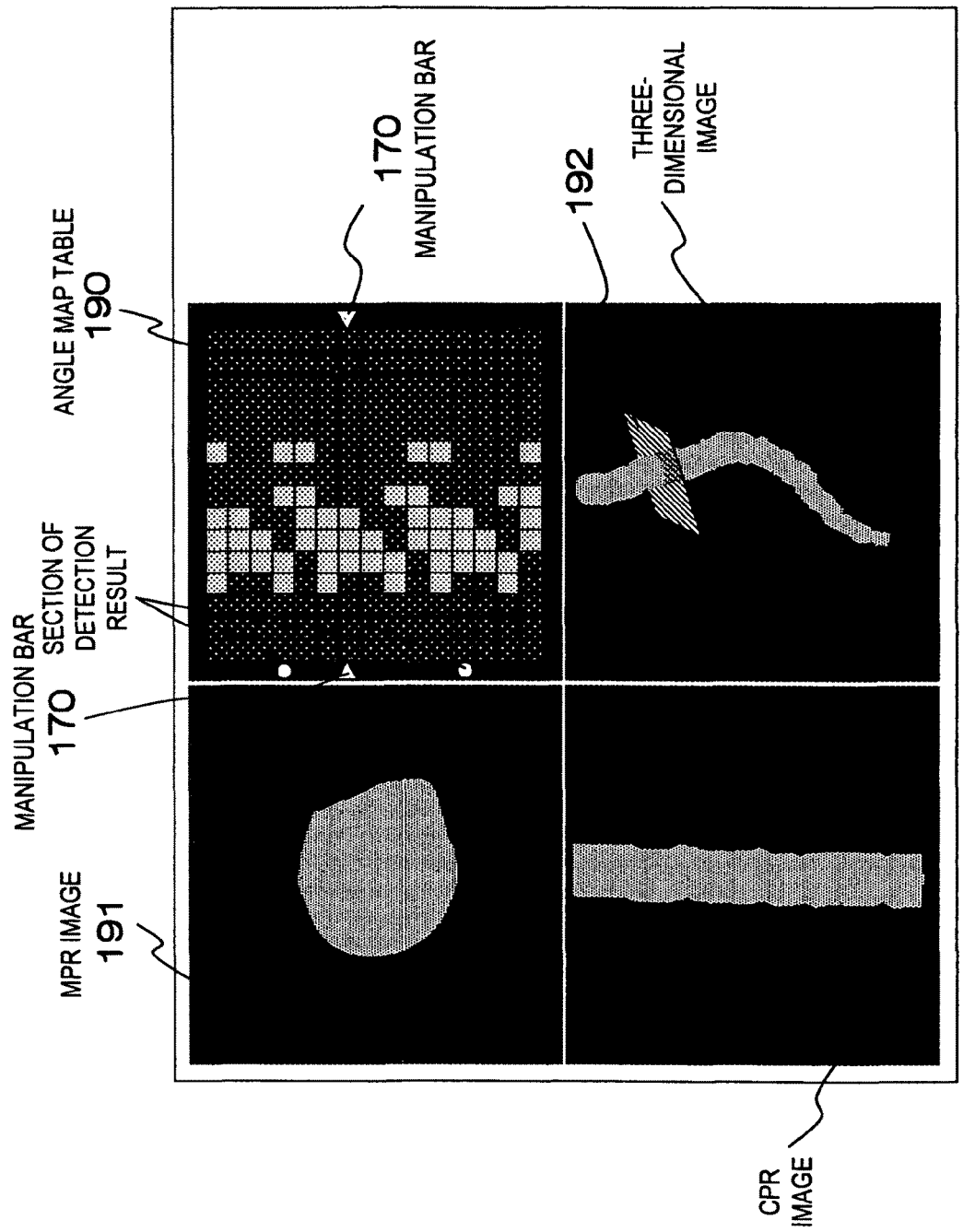
FIG. 14 shows an example of a displayed angle map and the result of detection in a second embodiment.

At S111, the display control section 11*g* displays the produced angle map table on the display (S110). FIG. 14 shows an example of displaying of an angle map table. In this example, the produced MPR images and angle map table of the tubular organ area, a curved planar reconstruction image (hereinafter abbreviated to CPR image) along the center line of the tubular organ area, and a three-dimensional image are displayed. The angle map table has at each of its two ends a manipulation bar 170 which can be shifted up and down on the screen with the mouse 16 or the like. The tomogram display control section 11*k*, when the manipulation bars 170 are moved up or down, displays an MPR image matching the angle map indicated by the manipulation bars 170. Also the tomogram display control section 11*k*, when the MPR image is repositioned, displays an angle map matching an MPR image for which the manipulation bars 170 at the two ends of the angle map have been altered. Further the tomogram display control section 11*k* displays on the three-dimensional image a matching MPR section. The tomogram display control section 11*k* displays the CPR image revolving around the center line of the CPR image. Also the tomogram display control section 11*k*, when the mouse cursor is aligned to any position on three-dimensional image and clicked, displays an MPR image matching it in region, and at the same time the manipulation bars 170 may be repositioned. In this embodiment, the wall area of the tubular organ is extracted, and an angle map table indicating density information representing each angle of that organ wall area is produced. By looking at the angle map table, sets of density information matching the positions in the running direction and the angular direction of the tubular organ can be seen in a comprehensive list form, and the visibility of density information in the tubular organ can be thereby improved.

While in the foregoing embodiment the center of gravity in the tubular organ is calculated and sets of density information in the radial direction the processing area are calculated with reference to this center of gravity, the reference point for calculation density information is not be limited to the center of gravity but any point in the hollow area within the tubular organ.

Further, in the example of FIG. 14, the configuration may as well be such that a manipulation bar is disposed at each of the upper and lower ends of the angle map table (or an angle map constituting one stage of the angle map table), the manipulation bars being configured to be movable right and left, and a simulated three-dimensional image (hereinafter referred to as "three-dimensional image"), MPR images and CPR images are switched over or rotated according to right and left motions. Or the configuration may as well be such that, when pixels constituting the three-dimensional image are clicked, the clicked pixels are caused to have the three-dimensional image so make a simulated three-dimensional rotation (hereinafter referred to as "3D rotation") as to display the three-dimensional image positioned foremost. In this case, the MPR images and the CPR images may also be rotated together with the 3D rotation of the three-dimensional image. The configuration may as well be such that, when pixels constituting the angle map table (or the angle map) are designated by clicking with the mouse, the three-dimensional image, MPR images and CPR images so make a 3D rotation as to bring the pixel matching that pixel to the foremost position or the position desired by the user.

Further, the manipulation bars may be so shifted as to indicate the position of the pixel in the angle map table matching the clicked pixel. These steps of processing are made possible by storing the coordinates of the angle map table related to the coordinates of the MPR images, CPR images and three-dimensional image, acquire the positional coordinates of the pixel designated by pixel designating device such as a mouse, and so converting coordinates as to bring the pixels in other images matching the acquired positional coordinates to the foremost position.

Further, a polar coordinate map or an expansion map, to be described afterwards, may as well be configured in place of the angle map table to achieve similar actions and effects.

Second Embodiment

By automatically retrieving and presenting the position the observer desires to note on the basis of the density information on angle maps produced in the first embodiment, reading of images can be improved in efficiency and supported.

Figure 15:
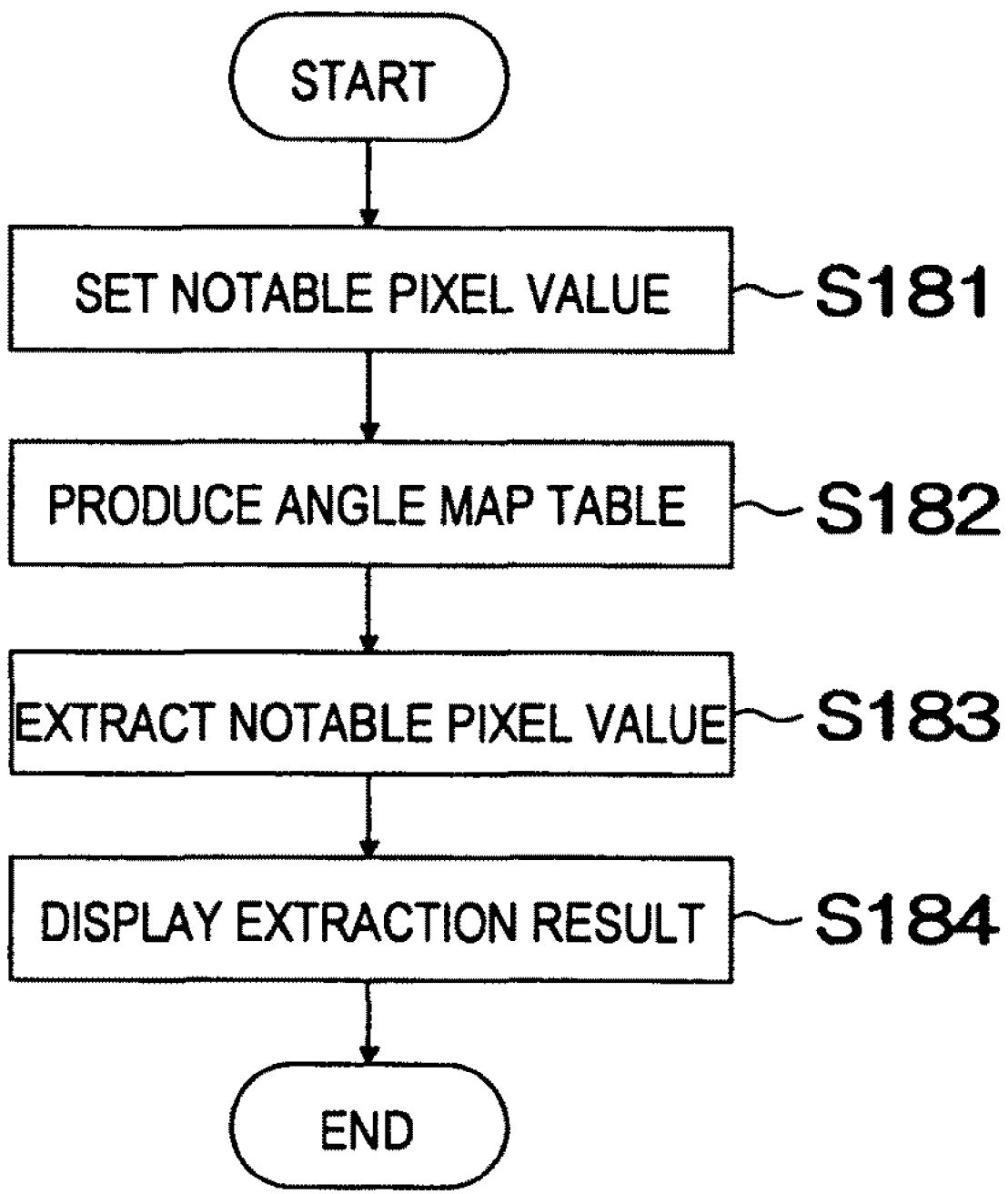
FIG. 15 is a flow chart showing an example of processing in the second embodiment.

FIG. 15 is a flow chart showing the flow of processing pertaining to the second embodiment. Processing in the second embodiment will be described in detail below following the sequence of steps in FIG. 15. Incidentally, the following description will refer to an image data set representing a blood vessel of the subject.

(Step S181)

At step S181, the noting condition setting section 11*h* accepts setting of the pixel value of the tissue to be detected (hereinafter referred to as "notable pixel value"). For instance, where a soft plaque in the coronary artery is to be detected, an input screen and the like are provided, and the operator is required to input the CT value range of soft plaque. A database in which tissues to be detected and CT values are related to each other may be built up and, when the tissue to be detected is selected, the database may be searched for the matching CT value range, which is caused to be reflected in the setting.

(Step S182)

Similar processing to that in the first embodiment is performed to produce an angle map table (S182).

(Step S183)

The notable pixel value is detected (S183). The noting condition extracting section 11i detects pixels and angle maps satisfying the conditions set at S181 out of the angle map table produced at S182. The noting condition extracting section 11i manipulates the angle maps pixel by pixel and, if there is any pixel satisfying the conditions set at S181, stores the sectional position containing that pixel.

(Step S184)

The result of extraction is displayed (S184). The notable area position display control section 11k displays the result of extraction stored at S183. FIG. 14 shows an example of extraction result displaying. As many parts here overlap with the first embodiment, the following description will apply in common to the first embodiment. The notable area position display control section 11k displays a marker 190 indicating the sectional position stored at S183 at each of the two ends of the angle map table to indicate the position where there is a notable area in the angle map table. When the operator clicks on the markers 190 with a mouse or the like, the tomogram display control section 11k displays an MPR image 191 matching that angle map. It also displays a matching MPR section on the three-dimensional image. Incidentally, it is sufficient to display the position of the result of detection to be distinctively recognizable by the observer if not by the markers 190.

Third Embodiment

Figure 16:
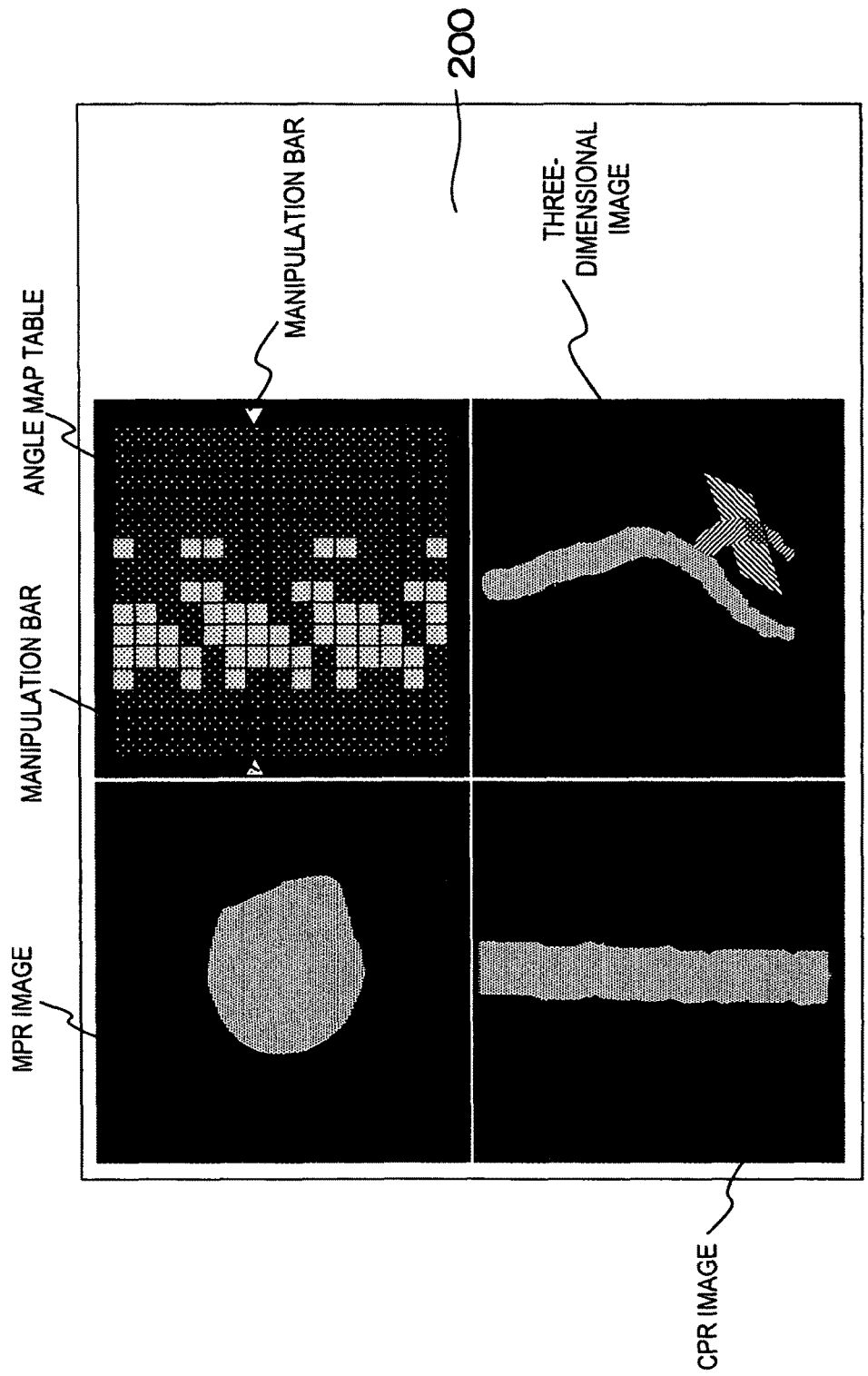
FIG. 16 shows an example of displayed angle map table in a third embodiment.

Regarding a third embodiment, a case in which the tubular organ is split into two or more branches will be described. When the tubular organ to be extracted is split into two or more branches, the operator selects the branch to be displayed on a three-dimensional image 200 with a mouse or the like. The CPU performs similar processing to that in the first embodiment described above, produces and displays the angle map table of the selected branch. FIG. 16 shows the three-dimensional image 200 of the tubular organ split into two branches. When the mouse cursor is aligned to the right side branch and clicked, the branch whose angle map is to be displayed can be selected.

The selected (right side) branch on the three-dimensional image is displayed in color to distinguish it from the undisplayed parts (the main tube and the left branch). Or an angle map may be produced from the main tube onward and, if it is branched, the branch of a smaller angle of bending (namely the branch with a smaller variation in angle) may be selected with priority. Further, if the tube is split, an angle map table may be produced of each of the main tube and the split branches, and these angle map tables may be displayed at the same time.

Fourth Embodiment

Figure 17:
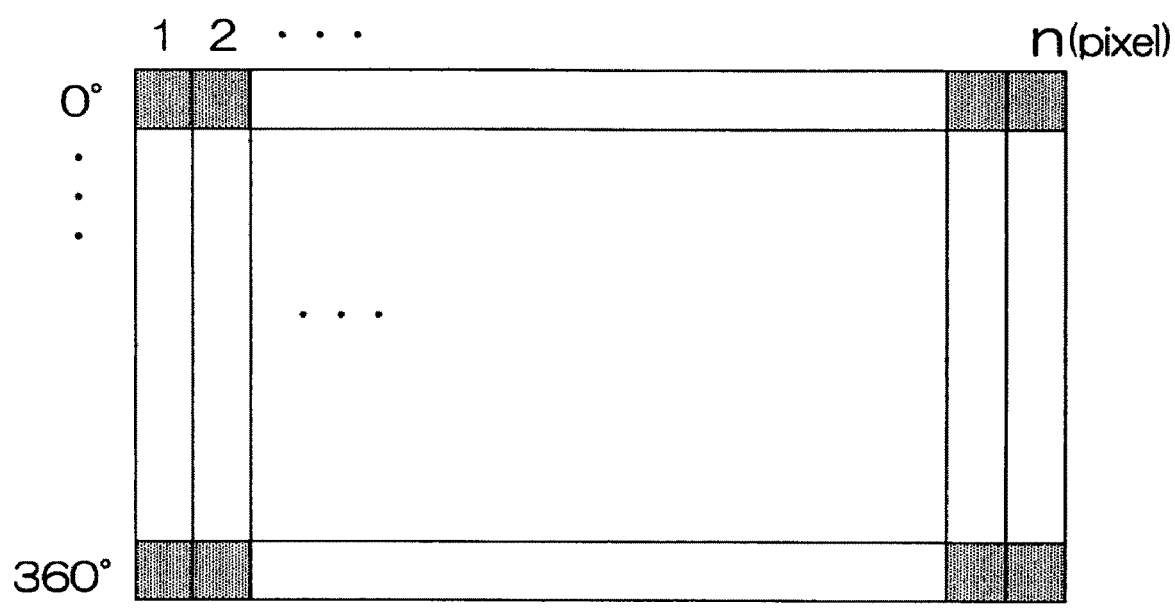
FIG. 17 shows an example of displayed angle map in a fourth embodiment.

In the foregoing embodiments, a plurality of MPR images were produced at prescribed intervals of a tubular organ, one density value representing one radial direction was calculated per MPR image, and an angle map was produced in the angular direction. Namely, one column of angle maps was produced per MPR image. In this embodiment, the processing area setting section 11 sets a hollow processing area of a prescribed pixel width, for instance an n pixel width per MPR image, and the density information calculating section 11e calculates the density value for each pixel in the radial direction. Then, the angle map producing section 11f calculates density values in the radial direction over 360 degrees around the center of gravity to produce angle maps in a table form. FIG. 17 shows an example of such angle map. In this angle map, pixels in the radial direction of the processing area, namely from inside (the side closest to the center of gravity) to outside (the direction toward the periphery of the object organ) are defined on the horizontal axis, and angles in the range of 360 degrees around the center of gravity are defined on the vertical axis. Then, the display control section 11g displays the angle map of FIG. 17. This enables density information all over the processing area of one MPR image to be seen at a glance. Means of setting the region in the tubular organ of which angle maps are to be produced in this embodiment may be configured as, for instance, means by which the operator aligns the mouse cursor with the desired region in the three-dimensional image and clicks. The MPR images are not limited to tomograms orthogonal to the center line of the tubular organ but also may be tomograms at any angle to the center line of the tubular organ.

Fifth Embodiment

Figure 19:
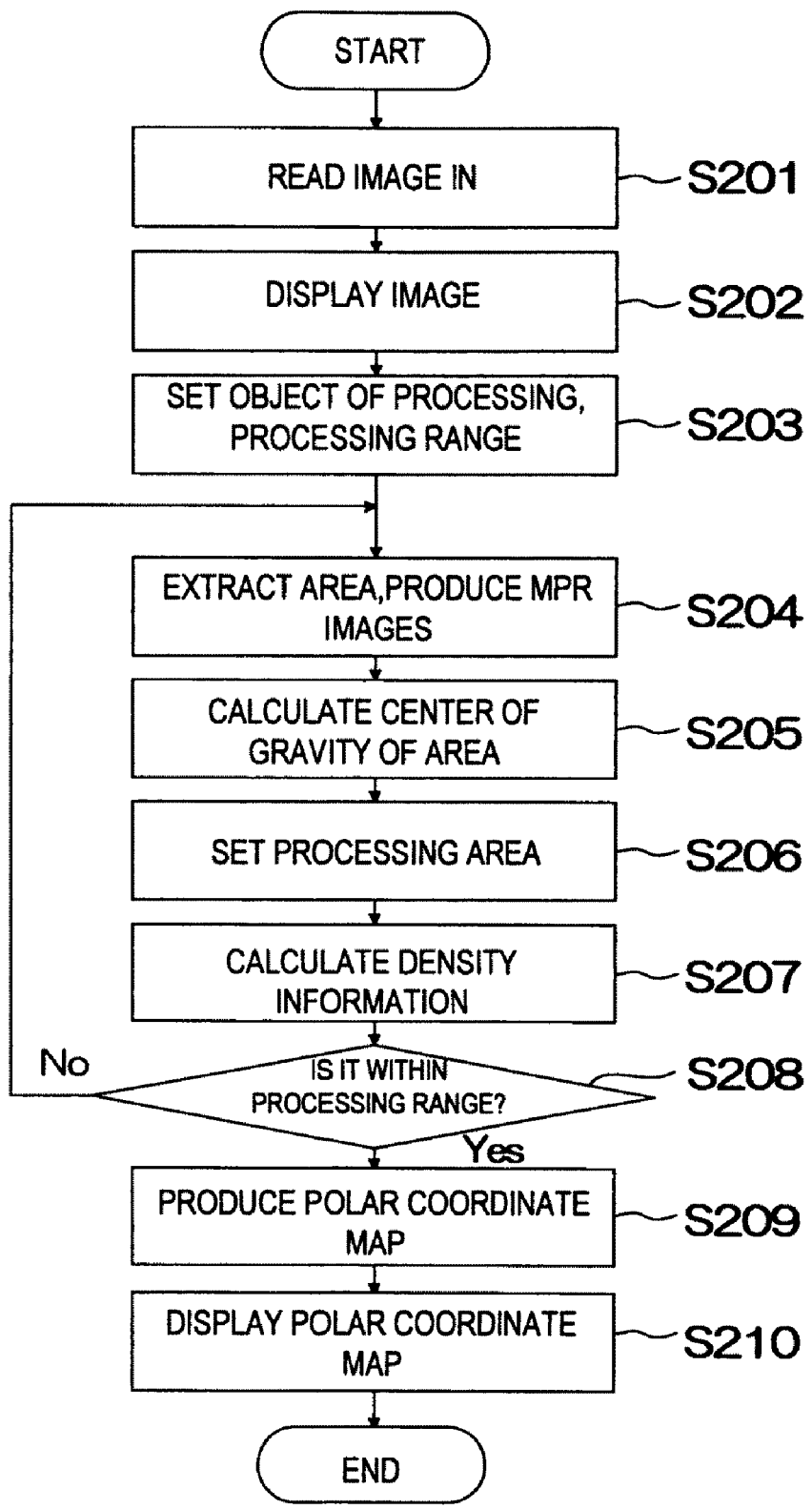
FIG. 19 is a flow chart showing the flow of processing in the fifth embodiment.
Figure 20:
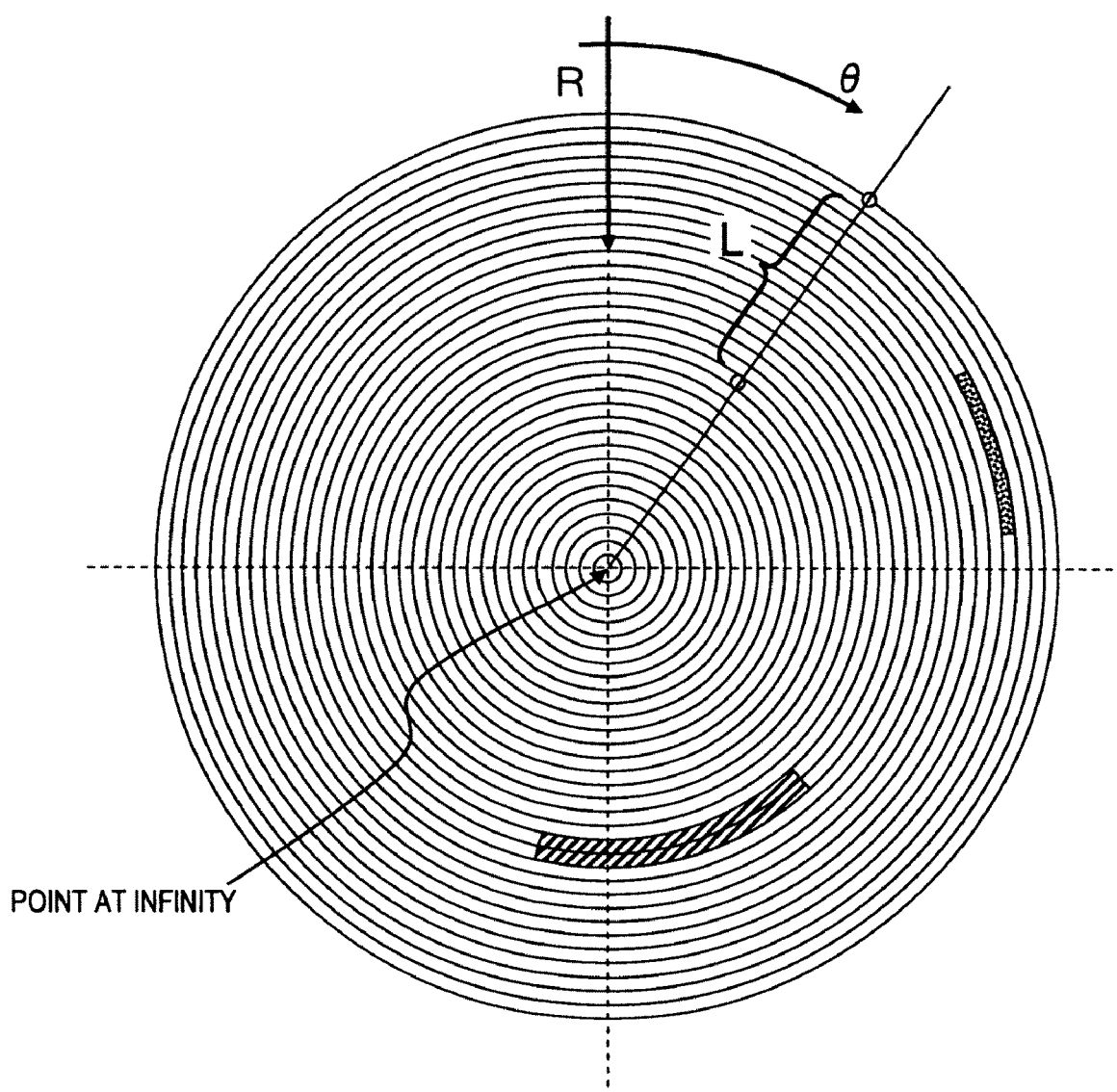
FIG. 20 shows an example of displayed polar coordinate map.

The fifth embodiment will be described with reference to FIG. 18 through FIG. 20. In this embodiment, polar coordinate maps polar coordinate maps are produced instead of angle maps in the first embodiment.

Figure 18:
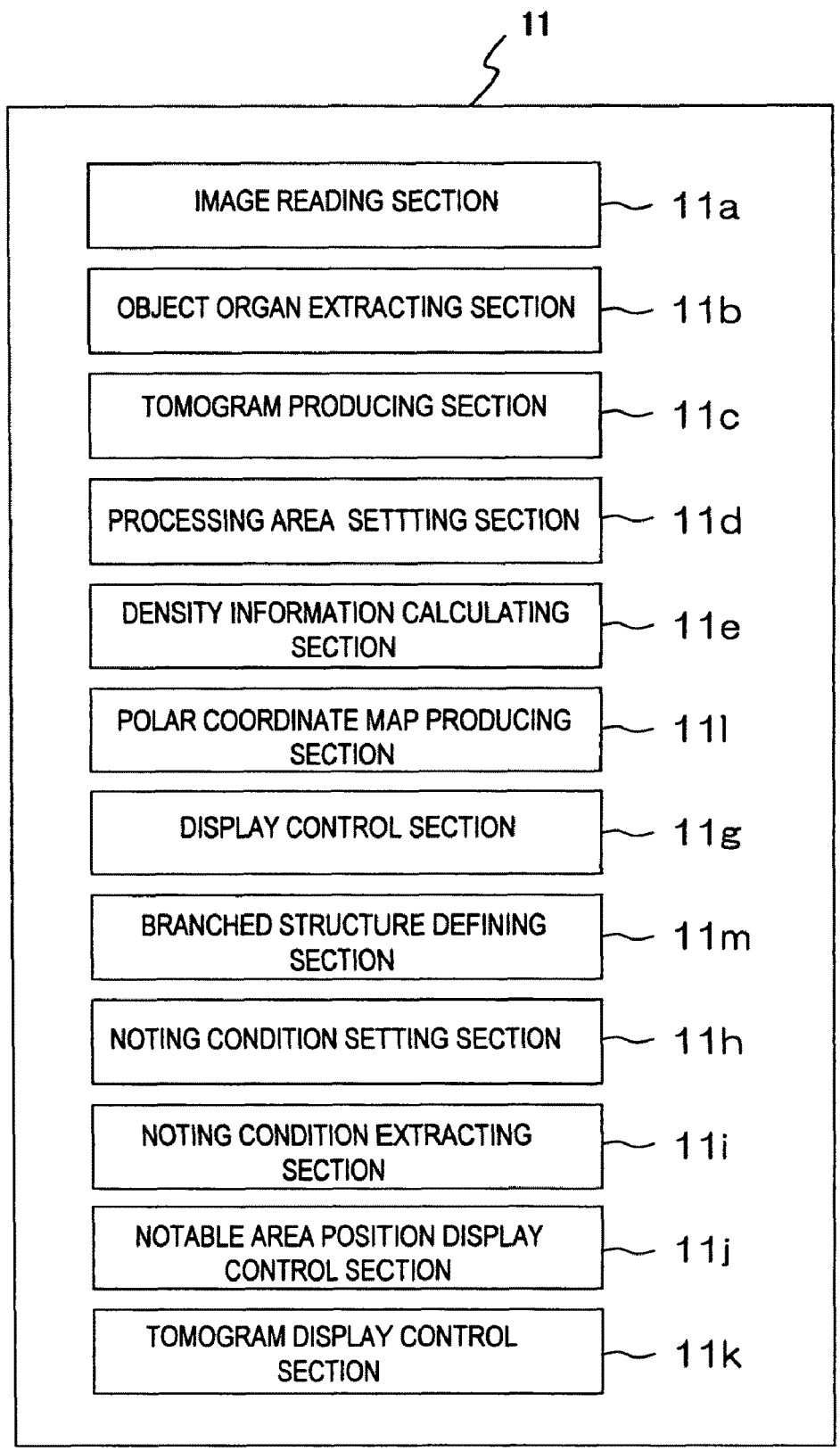
FIG. 18 is a program block diagram in a fifth embodiment.

FIG. 18 is a block diagram showing the configuration of a program in this embodiment.

The CPU executes the image reading section 11a, the object organ extracting section 11b, the tomogram producing section 11c, the processing area setting section 11d, the density information calculating section 11e, a polar coordinate map producing section 11l, the display control section 11g, a branched structure defining section 11m, the noting condition setting section 11h, the noting condition extracting section 11i, the notable area position display control section 11j and the tomogram display control section 11k, which together constitute the program. Of these, the image reading section 11a, the object organ extracting section 11b, the tomogram producing section 11c, the processing area setting section 11d, the density information calculating section 11e, the display control section 11g, the noting condition setting section 11h, the noting condition extracting section 11i, the notable area position display control section 11j and the tomogram display control section 11k are the same as in the first embodiment, and accordingly their description will be dispensed with. Incidentally, the display control section 11g controls the displaying of polar coordinate maps in this embodiment instead of angle maps.

The polar coordinate map producing section 11f maps density values in the processing area into polar coordinates having axes indicating the circumferential direction and the center line direction to produce polar coordinate maps.

The branched structure defining section 11h defines the branching structure of the tubular organ having a main trunk branch and split branches as a hierarchical structure. Incidentally in this embodiment, the "main trunk branch" means a branch having any viewpoint. When a viewpoint is to be transferred from a thick branch to a split thin one, the main trunk branch means the thick branch and the split branch, the thin one. Or when a viewpoint is to be transferred from a thin branch to a thick one connected to it, the main trunk branch means the thin branch and the split branch, the thick one.

These branched structure defining section 11m, noting condition setting section 11h, noting condition extracting section 11i, notable area position display control section 11j and tomogram display control section 11k are not indispensable constituent elements for the fifth embodiment, but are required constituent elements for other embodiments including a sixth embodiment and a seventh embodiment.

These programs are installed in the image display apparatus 10 of FIG. 1 and stored in the data storage device 13, and read out by the CPU 11 as appropriate into the main memory 12 for execution.

Next, the processing to have the image display apparatus 10 configured as described above display a polar coordinate map indicating image information on a tubular organ will be described with reference to FIG. 19. FIG. 19 is a flow chart showing the flow of processing to display a polar coordinate map. The CPU 11 controls the image display apparatus 10 in the sequence of this flow chart. A single blood vessel having no branched structure will be taken up as the example of tubular organ in the following description.

Description of the processing from S201 through S207 will be dispensed with because it is similar to the processing from S101 through S107 described above.

(Step S208)

The density information calculating section 11*e* determines whether or not the processing from step S203 through S207 has been completed to the extent set at step S203 (S208). If the end point of the extracted area is not reached, the processing returns to step S204 to produce an MPR image of the next region in the area, and performs processing from S205 through S207 to figure out the processing result V(θ) of each MPR image. When the whole area extracted as the tubular organ area has been processed, the processing moves on to step S209. Incidentally, though the density information calculating section 11*e* determines in the above-described procedure whether or not the processing has been completed to the extent set at step S203, this determination may as well be made by the polar coordinate map producing section 11*l* or a separate determining section may be provided for the purpose.

(Step S209)

At S209, the polar coordinate map producing section 11*l* produces a polar coordinate map (S209). The polar coordinate map producing section 11*l* defines a two-dimensional polar coordinate system (θ-R coordinate system) of which the radius represents the position in the center line direction of the tubular organ and the angle represents the angle (θ) in the circumferential direction of the processing area, and the density value Q (θ, R) calculated by the density information calculating section 11*e* is mapped on that two-dimensional polar coordinate system. This coordinate system may be either linear or nonlinear. In particular, an extensive range in the center line direction (the running direction) can be mapped by using logarithmic representation in the center line direction. When the radius of the polar coordinate map to be produced is to be represented in 256 pixels, the measured value obtained by dividing the distance between the start point and the end point by 256 is set to the representation distance per pixel. In this way, the distance between the start point and the end point can be represented at equal intervals. Or only the start point, but not the end point (a point at infinity is set), may be determined. In this case, the measured value per pixel is increased (elongated) with an increase in distance from the start point. Representation is made clear in the range close to the start point and rougher as the distance increases from the point, and in this way even regions far away from the start point can be represented in a single polar coordinate map.

(Step S210)

At S210, the display control section 11*g* displays the polar coordinate map on the display (S210). Pixels having an image information value Q correlated to lesions such as soft plaques or calcification are represented in a way well noticeable to the reading person, by coloring or blinking for instance. FIG. 20 shows an example of displayed polar coordinate map. The start point of the processing area is set on the outermost side of the R axis. L represents the transition distance from the start point of each section in the center line direction. The end point (or a point at infinity where no end point is set) is set at the center of the polar coordinate plane. Incidentally in FIG. 20, the region where soft plaques are present is represented by oblique lines and the region where calcification is observed, by dots (similar representations are used in the following drawings).

In this embodiment, the organ inner wall area of the tubular organ having a prescribed length is extracted, density values of that organ inner wall area are calculated, and a polar coordinate map matching the circumferential direction and the center line direction is produced. The map can display at once the density values of a tubular organ lumen of a prescribed length, and thereby reduce the image reading burden on the reading person.

Sixth Embodiment

Figure 21:
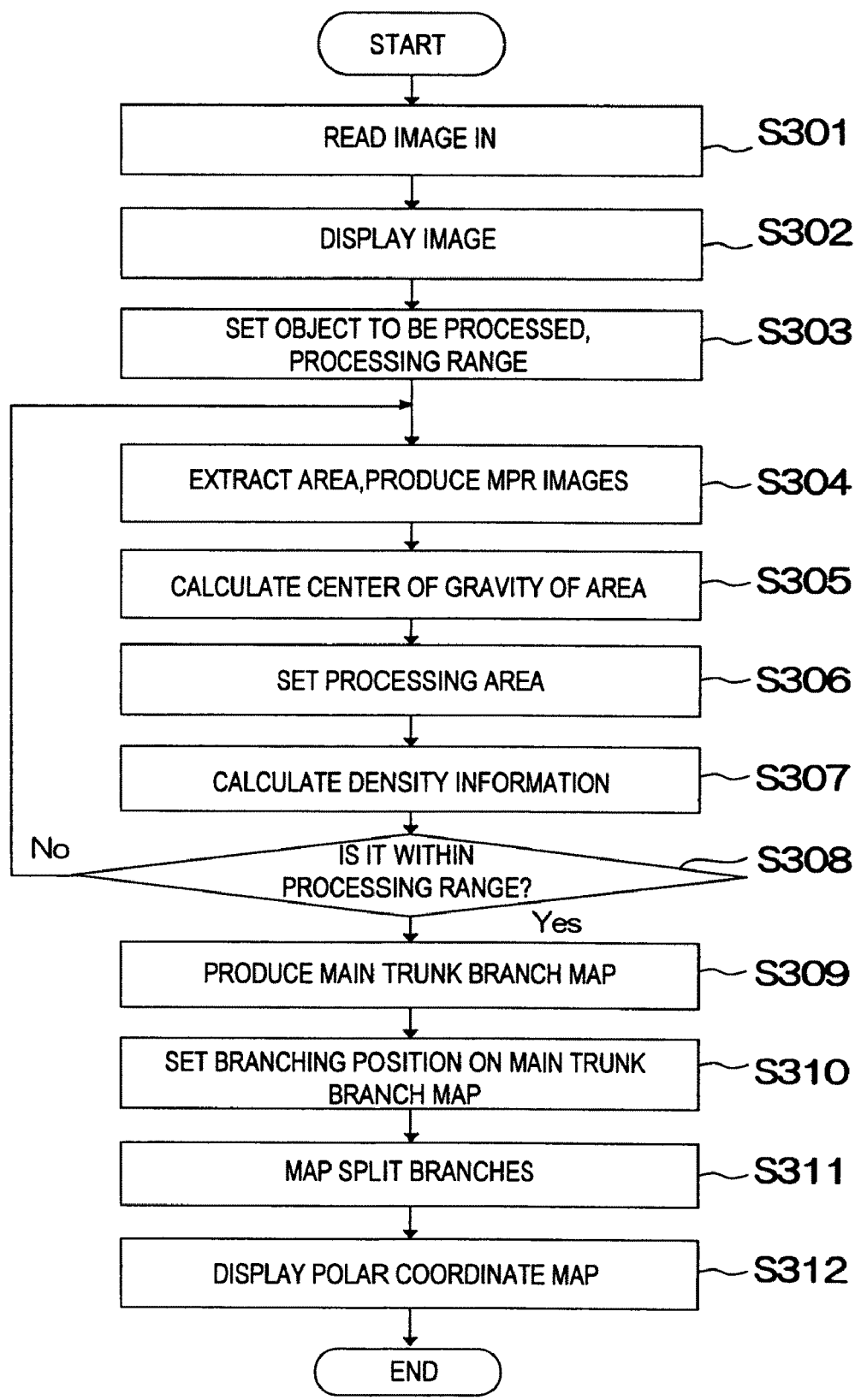
FIG. 21 is a flow chart showing the flow of processing in a sixth embodiment.

Regarding the sixth embodiment, a case of a branched blood vessel will be described. Mapping of the main trunk branch is accomplished similarly to the fifth embodiment until step S209. It is preferable for a branched blood vessel to be stored with the branched structure being included in the axial information on the tubular organ. In this case, it is preferable that a property including its position relative to the main trunk branch and its density information is defined as a structure for each of the split branches involved in the branched structure. Furthermore, it is desirable that the branched structure has been stored as a hierarchical structure. FIG. 21 is a flow chart showing the flow of processing in a sixth embodiment. Processing in the sixth embodiment will be described in detail below following the sequence of steps in FIG. 21.

Description of the processing from S301 through S303 will be dispensed with because it is similar to the processing from S201 through S203 described above.

(Step S304)

At S304, the object organ extracting section 11*b* extracts a tubular organ area out of the processing range of the image data set at S303. The branched structure defining section 11*h* extracts a main trunk branch area and a split branch area out of the extracted tubular organ area, and defines them in a hierarchical structure. At the same time, they are stored together with branching position information indicating the position of each split branch relative to the main trunk branch. The tomogram producing section 11*c* calculates the center lines of the main trunk branch and split branches, and produces an MPR image of each branch as at S204 (S304).

Description of the processing from S305 through S308 will be dispensed with because it is similar to the processing from S205 through S208 described above.

(Step S309)

The polar coordinate map producing section 11*f* produces a main trunk branch map on the basis of the density value and positional coordinates of the main trunk branch (S309).

(Step S310)

The polar coordinate map producing section 11*f* sets a position corresponding to the branching position on the main trunk branch map on the basis of the branching position information obtained at S303, and defines branched polar coordinates having that position as the origin (S310).

(Step S311)

The polar coordinate map producing section 11*f* maps the density value Q (θ, R) of the split branch area at the branched polar coordinates set at S310 (S311).

(Step S312)

The display control section 11h displays the polar coordinate map produced at S311 (S312). The display control section 11h subjects split branch maps to such processing as enlargement or contraction and displays them superposed over the main trunk branch map. When they are displayed, it is desirable for the image size of the split branch maps to be equal to or smaller than the joint size of branching parts. The reason is not to prevent information to erase the main trunk branch from being displayed. Even if the joint part is circular, its original shape may be deformed in order to display it on the same coordinate system without inconsistent because it is not circular on the polar coordinates.

Figure 22A:
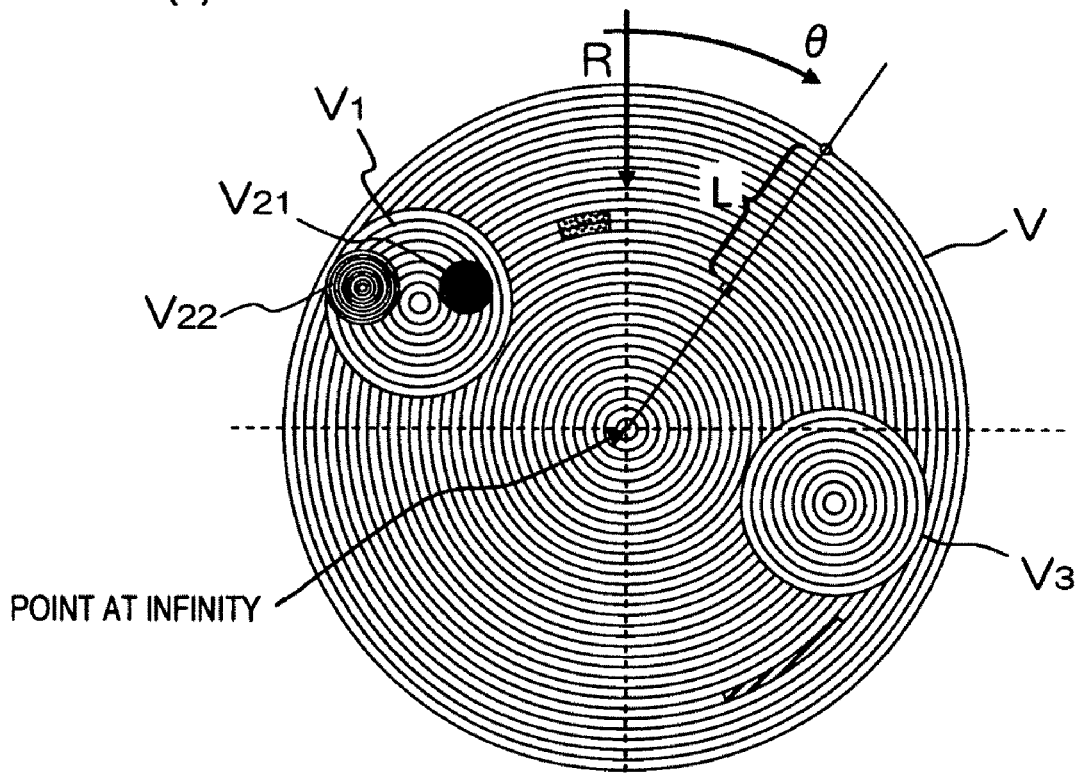
FIG. 22(a) is a schematic diagram showing an example of displaying in the sixth embodiment.

FIG. 22(a) shows an example of displaying split branch maps superposed over the main trunk branch map. In FIG. 22(a), a polar coordinate map V represents the main trunk branch map. Polar coordinate maps V1 and V3 represent split branch maps. The positioning of the polar coordinate map V1 to the left of the polar coordinate map V indicates that the split branch represented by the polar coordinate map V1 splits leftward with reference to the viewpoint of the main trunk branch. Similarly, the positioning of the polar coordinate map V3 to the right of the polar coordinate map V indicates that the split branch represented by the polar coordinate map V3 splits rightward with reference to the viewpoint of the main trunk branch. The positioning of polar coordinate maps V21 and V22 within the polar coordinate map V1 indicates that the split branches represented by the polar coordinate maps V21 and V22 are split branches V21 and V22 further splitting from the split branch V1.

Figure 22B:
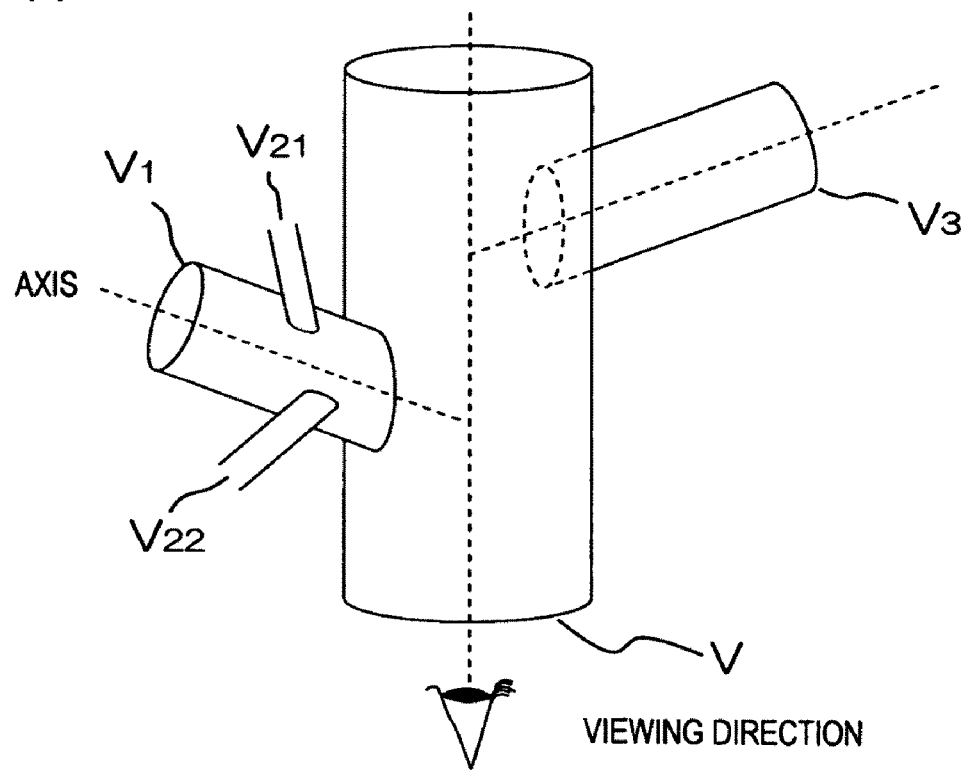
FIG. 22(b) shows an example of structure of a blood vessel matching that example of displaying.

Further, FIG. 22(b) shows an example of branched structure of a blood vessel matching FIG. 22(a). V represents the main trunk branch, V1 and V3, primary split branches, and V21 and V22, secondary split branches.

As information on split branches is displayed superposed over the mapped image of the main trunk branch in this embodiment, density values of split branches ahead of the main trunk branch can be observed at once.

Seventh Embodiment

A seventh embodiment is intended to improve the visibility of information on split branches greater in hierarchical depth. It is desirable for a split branch map to include information on further branches ahead. However, if the display size of the split branch map on the main trunk branch map becomes smaller, the number of pixels also becomes smaller, and small lesions may become impossible to discover. For this reason, in the seventh embodiment, notable area detecting device for extracting an abnormal candidate area is further provided. Whereas detection of a notable area is accomplished by simple threshold processing or from the density gradient, these are not the only available means.

Figure 23:
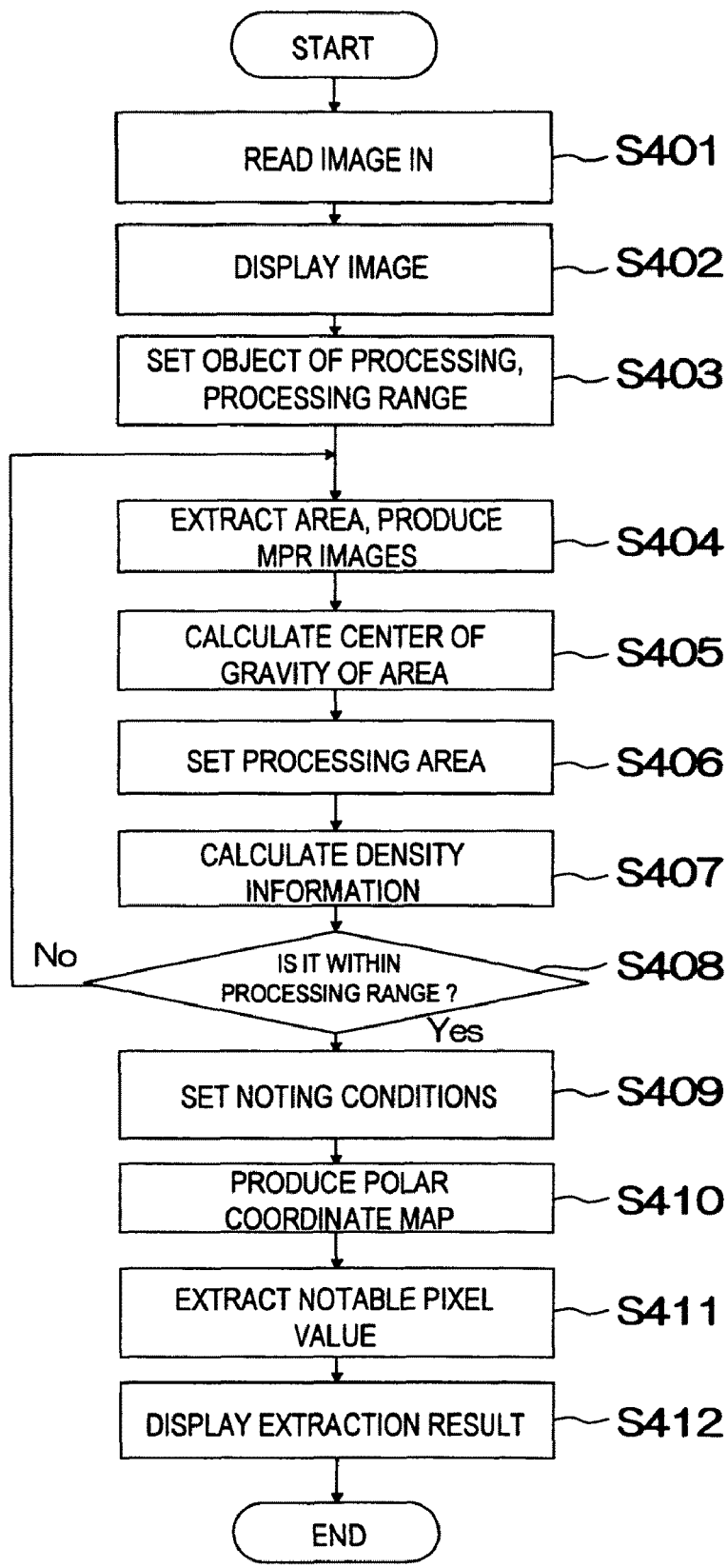
FIG. 23 is a flow chart showing the flow of processing in a seventh embodiment.

FIG. 23 is a flow chart showing an example of processing to extract a notable area. The processing will be described in detail below following the sequence of steps in FIG. 23. Incidentally, the case to be described below concerns a CT image data set obtained by shooting a blood vessel of the subject.

Description of the processing from S401 through S408 will be dispensed with because it is similar to the processing from S101 through S108.

(Step S409)

At step S409, the user inputs the pixel value of the lesion tissue to be detected (hereinafter referred to as "notable pixel value") with the mouse 16 or the keyboard 17. The noting condition extracting section 11i sets noting conditions on the basis of the inputted information (S409). For instance, if any soft plaque in the coronary artery is to be detected, an input screen or the like is provided, and a density range of the CT value or the like of a soft plaque is inputted. The tissue to be detected and the density value range may be related to each other to be organized into a database, and the tissue to be detected may be selected to search the matching density value range in the database to have it reflected.

(Step S410)

As at S209, a polar coordinate map is produced (S410).

(Step S411)

The notable area extracting section 11j detects a notable pixel value (S411). It extracts from the polar coordinate map produced at S410 pixels satisfying the conditions set at S409. It scans the polar coordinate pixel by pixel and, if there is any pixel satisfying the conditions set at S409, stores the position containing that pixel.

(Step S412)

The result of extraction is displayed (S412). The display control section 11g displays in the position stored at S411 an image indicating the presence or absence of any notable area.

In the simplest form of this embodiment, the presence or absence of a notable area (abnormal candidate area) is differentiated by color in display. As is the case with the split branch V21 in FIG. 22(a), in place of the split branch map of V21, that split branch map is displayed, using only coloring to indicate the presence or absence of any notable area. This can be realized by so programming as to make definition as a structure (hierarchical structure) as in the seventh embodiment and, if there is any notable pixel on the split branch, to propagate the pixel information to the main trunk branch map. More specifically, when contracting the split branch map and interpolating into the main trunk branch map, if the interpolated area contains a notable pixel, the value of the notable pixel is regarded as the result of interpolation processing. Other than differentiation by color, blinking the display or arrow displaying may be used as well.

Incidentally, though the setting of noting conditions (S409) is supposed to be performed after S408 in this embodiment, the setting of noting conditions does not need to follow this sequence. For instance, the user may set noting conditions after producing a polar coordinate map, or the user may set noting conditions before starting the reading of an image data set (S401) and produce a polar coordinate map in which a notable area is indicated.

By automatically retrieving and presenting the target lesion the observer desires to note on the basis of the density values of the tubular organ and polar coordinate maps in this embodiment, reading of images can be improved in efficiency and supported.

Various graphical user interfaces (GUIs) are conceivable for use. Selecting a split branch map interpolatively arranged on the main trunk branch map by clicking or otherwise would result in redrawing in an enlarged display. A split branch once read may be displayed in an altered color. Also, the processing range of the center line direction of the tubular organ displayed on the polar coordinate map may be arranged in the vicinity of a position of one pixel or less.

Also, the viewpoint may be advanced by clicking a point on the polar coordinate map with the mouse 16. Thus, clicking with the mouse 16 may cause a polar coordinate map in which the clicked position corresponds to the outermost circumference of the existing polar coordinate map to be newly produced and displayed.

Figure 24:
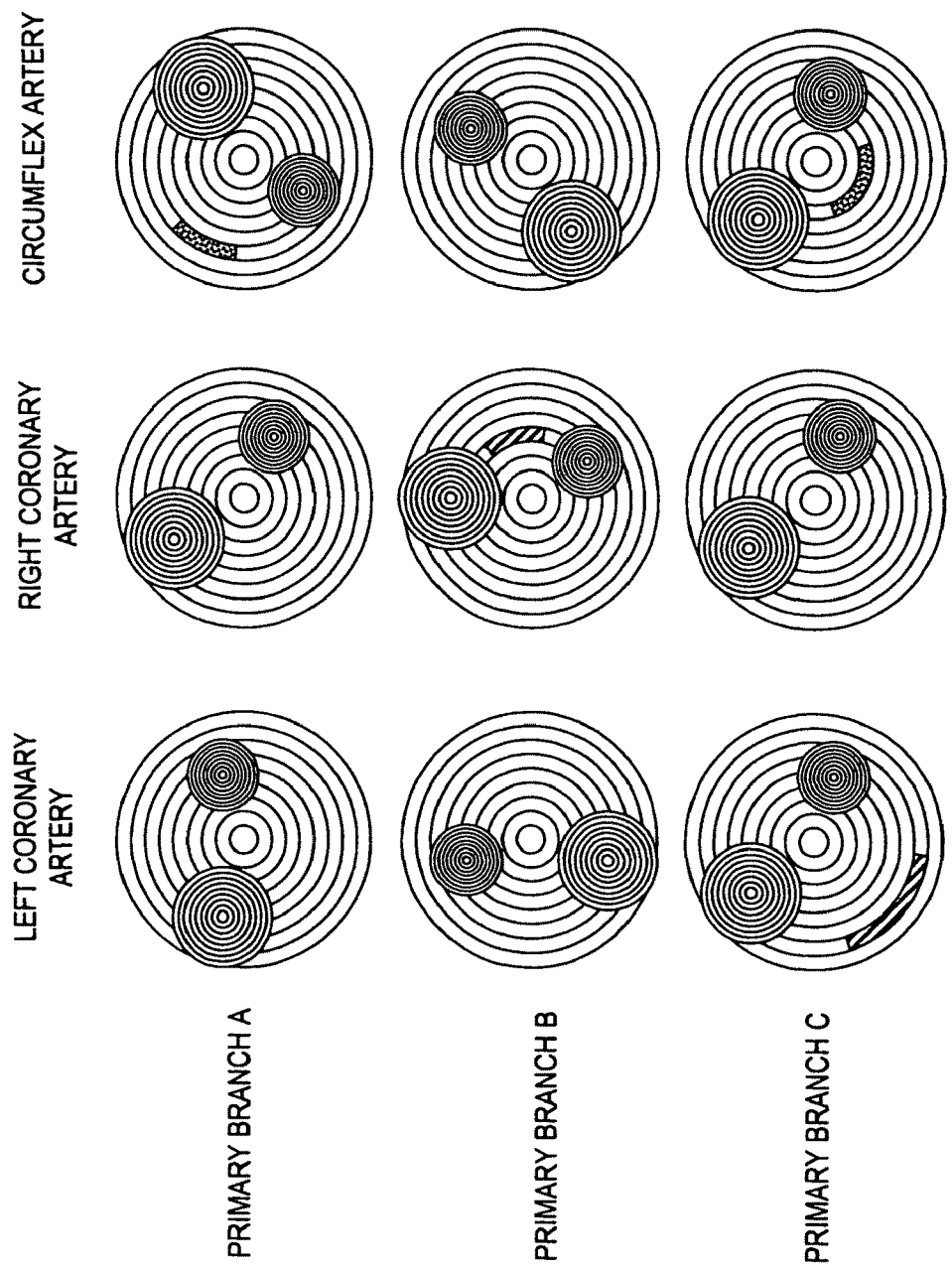
FIG. 24 shows an example of parallel displaying of coronary arteries.

Further, in the case of coronary arteries for instance, in order to facilitate recognition of the whole cardiac blood vessel system, a plurality of primary branched blood vessels may be displayed in parallel for each of the three main coronary arteries including the left coronary artery, the right coronary artery and circumflex arteries as shown in FIG. 24.

Figure 25:
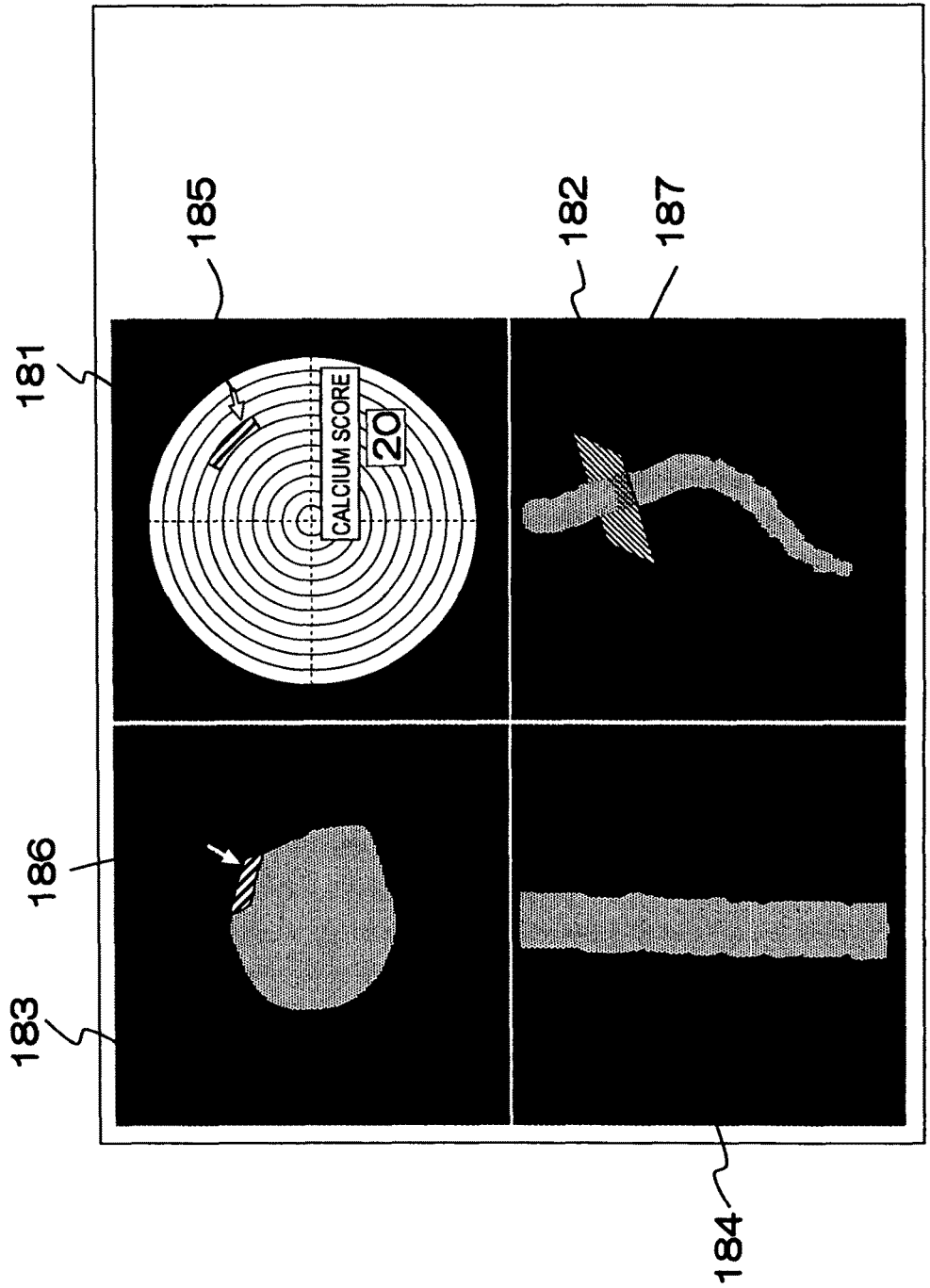
FIG. 25 shows an example of parallel displaying of a polar coordinate map and other analytical information.

Alternatively, as in FIG. 25, together with a polar coordinate map 181, other images including a three-dimensional image 182, an MPR image 183 and a CPR image 184 may be displayed in parallel on the display screen. A marker 185 that can be moved with the mouse 16 or the like is provided on the polar coordinate map, a marker 186 that can be moved with the mouse 16 or the like is provided on the MPR image, and the marker 185 and the marker 186 are related to each other. For instance, the position on the MPR image corresponding to the position indicated by the marker 185 on the polar coordinate map 181 is caused to be indicated by the marker 186. This enables the observation of the noted area to be recognized on the MPR image. Also, a marker 187 movable with the mouse 16 or the like is provided on the three-dimensional image. The marker 187 relates the polar coordinate map 181 to the MPR image 183. The polar coordinate map 181 indicates a sectional position matching the marker 187 in a way of image displaying recognizable by the reader of the image, for instance by coloring or blinking. The MPR image 183 represents a tomogram in the position indicated by the marker 187. Incidentally, marking need not be made with the markers 185, 186 and 187, but any marking which makes the display positions comprehensible to the reader of the image would be adequate. The layout and combination of images are not limited to what are described here.

Further, together with the polar coordinate map 185, other items of analytical information may also be displayed. For instance, the calcium score may be displayed on the polar coordinate map 185 in superposition (indicates as "Calcium score 20" in FIG. 25), differentiated in color according to the score grade, or superposed on the polar coordinate map together with polar coordinate representations such as wall motion and wall contraction.

Eighth Embodiment

An eighth embodiment is a processing to more accurately extract abnormal regions such as soft plaques and calcification having occurred on the wall surface of the tubular organ area, which is executed by the density information calculating section 11e at step S107 in the first embodiment.

Figure 26:
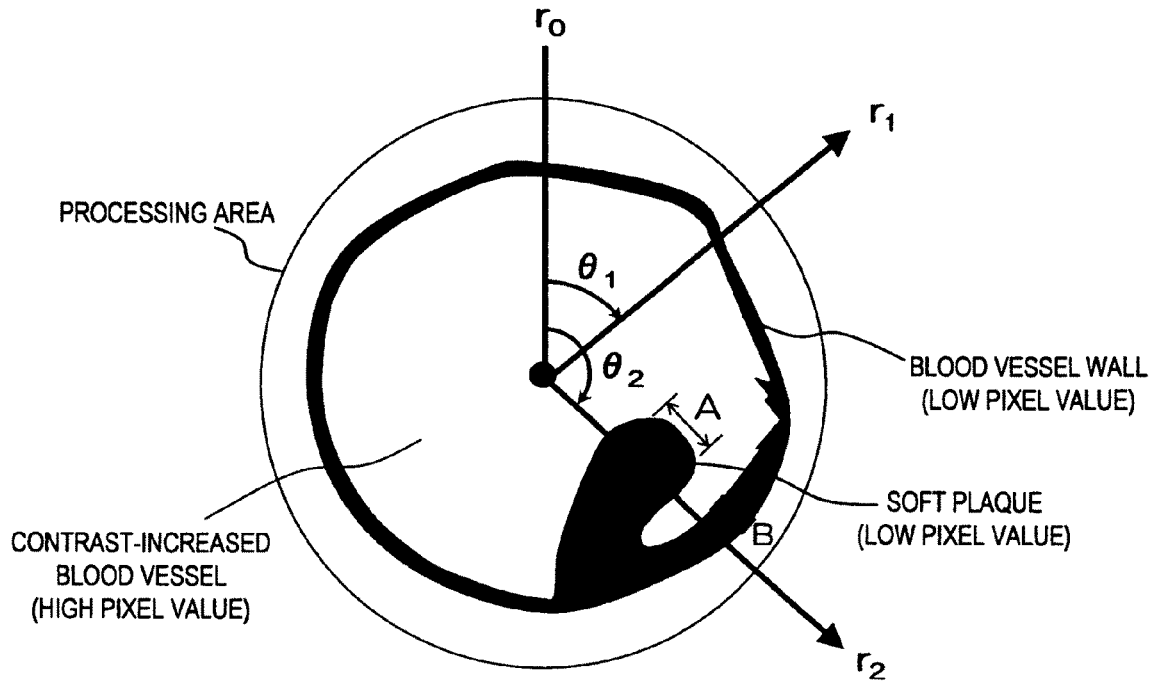
FIG. 26 is a schematic diagram showing a soft plaque present on a contrast-increased blood vessel wall.

FIG. 26 illustrates a soft plaque present on a contrast-increased blood vessel wall picked up with an X-ray CT apparatus. When a soft plaque is drawn by using the above-described image processing technique, since the pixel value of the soft plaque is lower than that of the contrast-increased blood vessel, a conceivable way to survey the distribution of soft plaques is to figure out density characteristic quantities by the minimum value projection method. However, since the pixel value of a blood vessel wall picked up with an X-ray CT apparatus is close to that of a soft plaque, segregation between a soft plaque and a blood vessel wall may be sometimes difficult. This embodiment provides processing to separate the soft plaque and the blood vessel wall from each other in such a case.

A soft plaque may sometimes have a shape of protruding from the inner wall of a tubular organ as shown in FIG. 26. In such a case, efficient extraction of the soft plaque can be accomplished by prioritized projection of pixel values close to the center of the tube.

Figure 27:
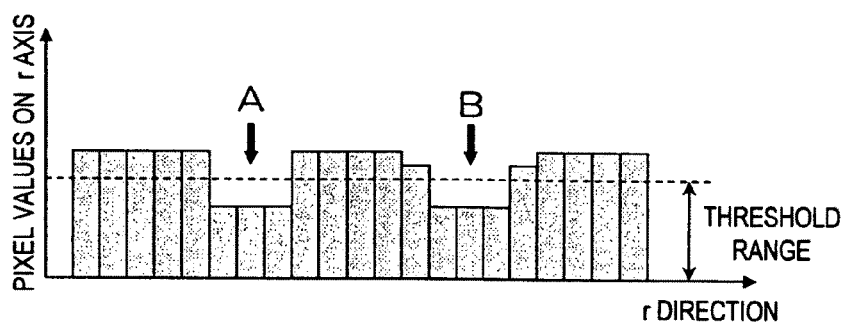
FIG. 27 is a diagram in which the horizontal axis represents the radial direction (r direction) of a tubular organ area and pixel values on the r axis are shown in a bar graph.
Figure 28:
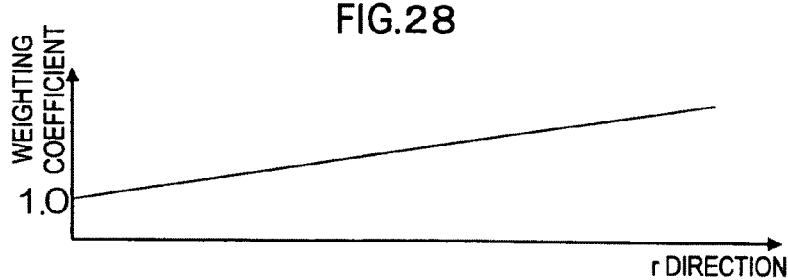
FIG. 28 shows an example of weighting shape.
Figure 29:
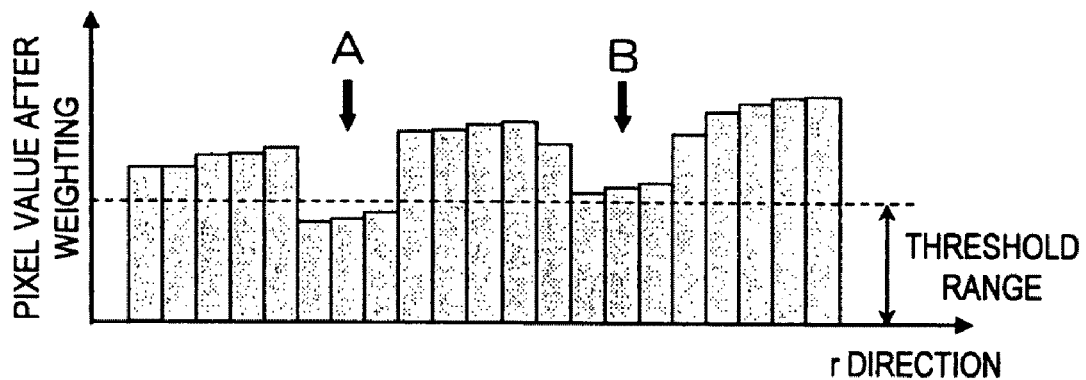
FIG. 29 illustrates the pixel values in FIG. 31 as multiplied by the weighting coefficient of FIG. 32.

FIG. 27 is a diagram in which the horizontal axis represents the radial direction (r direction) of a tubular organ area and pixel values on the r axis are shown in a bar graph. It is hypothetically supposed here that there are low pixel value areas A and B differentiated by a threshold on the r axis. In order to prioritize projection of the low pixel value area A close to the center of the processing area (e.g. the center of gravity), a weight whose weighting coefficient increases with the elongation of the distance from the center of gravity can be added to pixel values in a weighted way to process minimum value projection. FIG. 28 shows an example of weight shape, in which the weighting coefficient, which is 1.0 at the center of the processing range linearly increases in the radial direction. The weight shape may be either nonlinear or a combination of linear and nonlinear. FIG. 29 illustrates the pixel values in FIG. 27 as multiplied by the weighting coefficient of FIG. 28. In FIG. 29, as the low pixel value area B is moved away from the threshold range due to the weighting, it is not taken into consideration in calculating density characteristic quantities, and the low pixel value area A is extracted with priority. This method enables prioritized projection of pixel values closer to the center of the tubular organ.

Another means for segregating the blood vessel wall and the soft plaque from each other include a mode which utilizes the case where soft plaques may be distributed in a broader range in the radial direction than blood vessel walls as shown in FIG. 9. In this case, efficient extraction of soft plaques can be accomplished by designating any threshold of distribution width in any direction and identifying what are equal to or greater than that distribution width as soft plaques.

Figure 30:
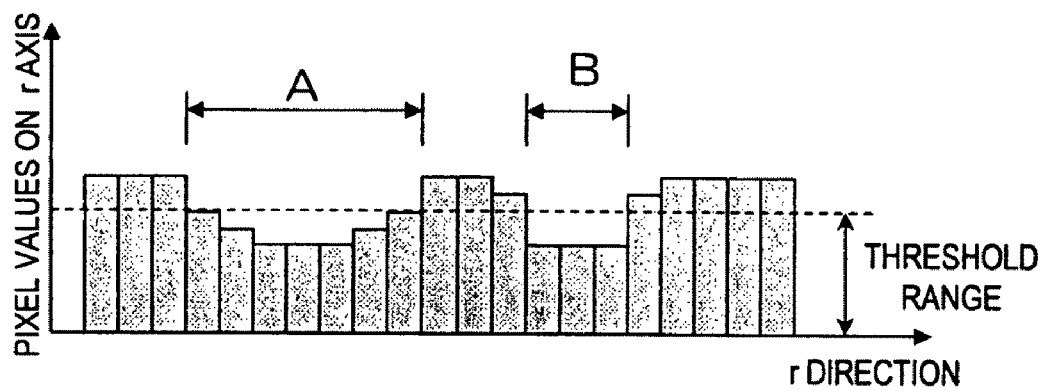
FIG. 30 is a diagram in which the horizontal axis represents the radial direction and pixel values on the r axis are shown in a bar graph.

FIG. 30 is a diagram in which the horizontal axis represents the radial direction and pixel values on the r axis are shown in a bar graph. It is hypothetically supposed here that there are low pixel value areas A and B differentiated by a threshold on the r axis. Assuming that the low pixel value area A distributed over a greater range is soft plaques, the low pixel value area A can be extracted as soft plaques by setting the threshold distribution width to five pixels.

Figure 31:
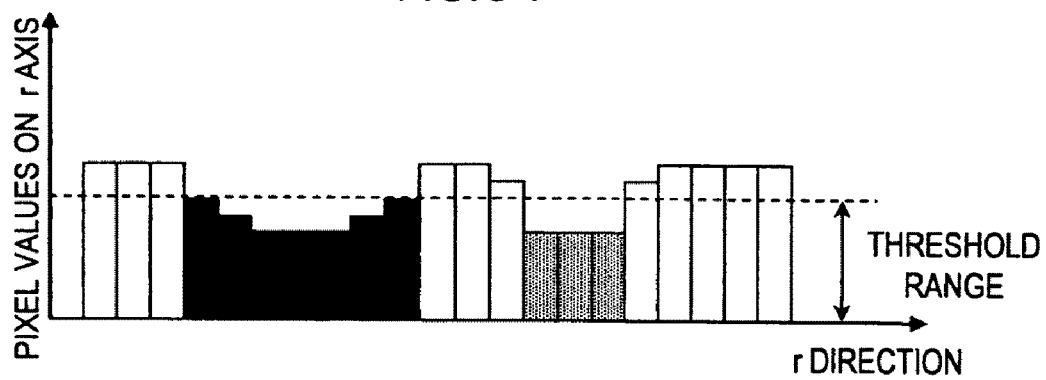
FIG. 31 illustrates a case in which the accumulated value of the number of pixels in a threshold range is converted into a shadow value.

Or, by utilizing the wider distribution of soft plaques than blood vessel walls in the radial direction, the accumulated value of the number of pixels in a threshold range or the distance corresponding to the distribution width of pixels may be converted into a shadow value to produce an image as shown in FIG. 31. For instance in FIG. 31, there are seven pixels whose values are not greater than the threshold in the low pixel area A and three pixels whose values are not greater than the threshold in the low pixel area B, while there are no pixels whose values are not greater than the threshold nowhere else than in the low pixel areas A and B. Accordingly, the density value of the other areas than the low pixel areas A and B are converted into the lowest density value, that of the low pixel area B is converted into higher density value and that of the low pixel area A is converted into the highest density value. Then, the density information calculating section 11e may be so configured as to calculate the highest density value as its density information.

Processing to calculate the density distribution described above is executed at step S107 in the first embodiment, followed by step S108. Incidentally, processing in this embodiment is executed on each of the MPR images produced at step S104.

The effectiveness of this embodiment is not limited to soft plaques, but it can also be effective on other objects of observation around tubular organs including calcification and polyps. This mode is applicable not only to the minimum value projection method but also to other image processing techniques including the maximum value projection method and the cumulative averaging method.

Ninth Embodiment

A ninth embodiment concerns the mode of displaying the angle map table at step S111 in the first embodiment.

Figure 32:
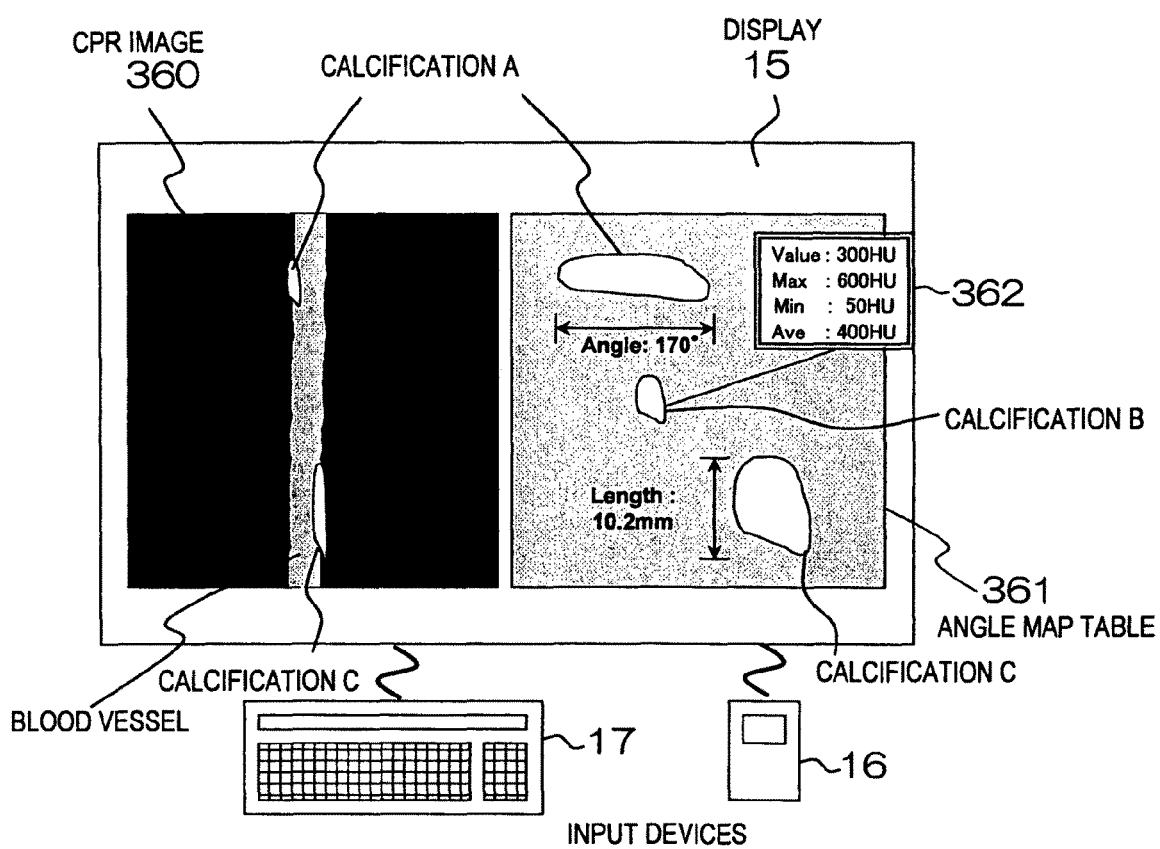
FIG. 32 is a schematic diagram illustrating a state in which a CPR image and an angle map table are displayed in parallel and analytical information is displayed together with the angle map table.

FIG. 32 illustrates a state in which a CPR image 360 and an angle map table 361 are displayed in parallel by the tomogram display control section 11k. A calcification A is displayed on the upper left side of the CPR image 360, and a calcification C, on the lower right side. However, the wholes of the calcification A and the calcification C, and a calcification B are not displayed on the CPR image 360. Against this, the angle map table 361 displays what positions in the tubular organ area the wholes of the calcifications A, B and C are in. This enables density information in the part which the CPR image 360 by itself cannot show to be displayed by the angle map table 361, and even in the case where the shape of the tubular organ area in the center line direction in hand to be recognized only by the angle map table 361, the CPR image 360 to facilitate recognition of the shape.

FIG. 32 shows a state in which analytical information on the calcifications A, B and C is displayed together with the angle map table 361. These items of analytical information are stored related in advance to image data. When the display control section 11*d* displays the angle map table 361, analytical information on the calcification A, B and C is also displayed together. In FIG. 32, longer diameters which are the characteristic quantities of the calcifications A, B and C are displayed as the analytical information. Further, when the operator clicks the calcification B, for instance, with the mouse 16, even more detailed analytical information is displayed in a pop-up window 362. Although a case in which analytical information is displayed in the angle map table 361 was described with reference to FIG. 32, the analytical information may as well be displayed on a polar coordinate map or an unfolded map to be described afterwards.

Figure 33:
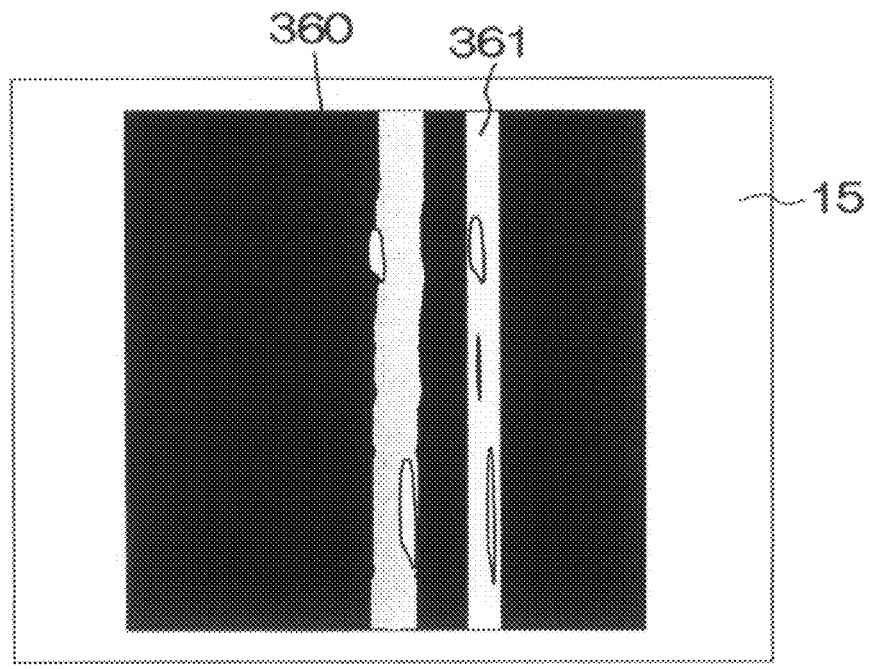
FIG. 33 is a schematic diagram illustrating a state in which the width of an angle map table and the width of a CPR image are displayed substantially equally.

FIG. 33 shows a case in which the width of the angle map table 361 in the angular center line direction and the width of the CPR image 360 in the radial direction in FIG. 32 are displayed to be substantially equal. "Substantially equal" in this context means that the angle map table 361 and the CPR image 360 are displayed within a difference in width small enough to make them look equal at a glance, and it is desirable for the width of the angle map table 361 in the angular center line direction to be displayed, for instance, within less than twice that of the CPR image 360 in the radial direction at the maximum.

Figure 34:
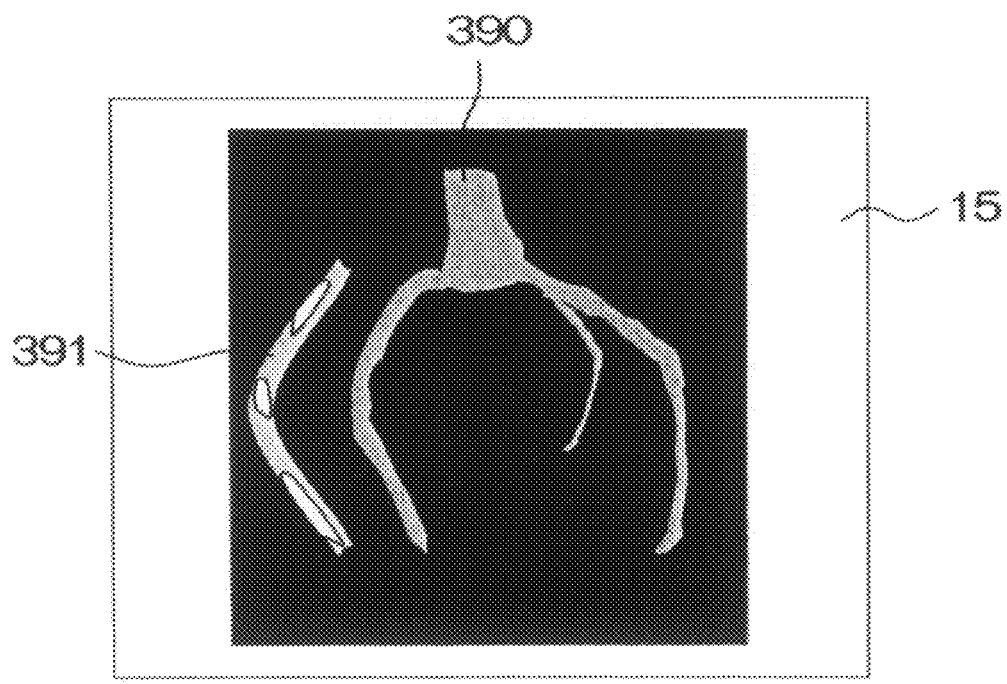
FIG. 34 is a schematic diagram illustrating an example in which a 3D image and an angle map table 391 are displayed substantially in parallel.

FIG. 34 illustrates an example in which a 3D image 390, displaying a blood vessel area as a tubular organ and an angle map table 391 of the blood vessel area, contained in that 3D image 390, are displayed to make the running direction (center line) of the 3D image 390 and the positional axis of the angle map table 391 are substantially in parallel. "Substantially parallel" in this context means that the 3D image 360 and the angle map table 361 are displayed in an apparently same way of curving, and it is desirable for the positional axis of the 3D image 360 to be displayed at less than 90 degrees at the maximum to the center line of the angle map table 361.

10th Embodiment

Regarding this embodiment, an unfolded map in which density information in an angular direction around the center line is arranged in the radial direction on a projection plane parallel to the center line direction of the tubular organ area is made the density distribution will be described.

Whereas the polar coordinate map shows a density distribution by arranging in an angular direction the density characteristic quantities in the radial direction, it is difficult to recognize from the polar coordinate map positional information in the radial direction, for instance the position and size of a polyp on the intestinal wall.

The unfolded map pertaining to this embodiment facilitates recognition of positional information in the radial direction.

Figure 35:
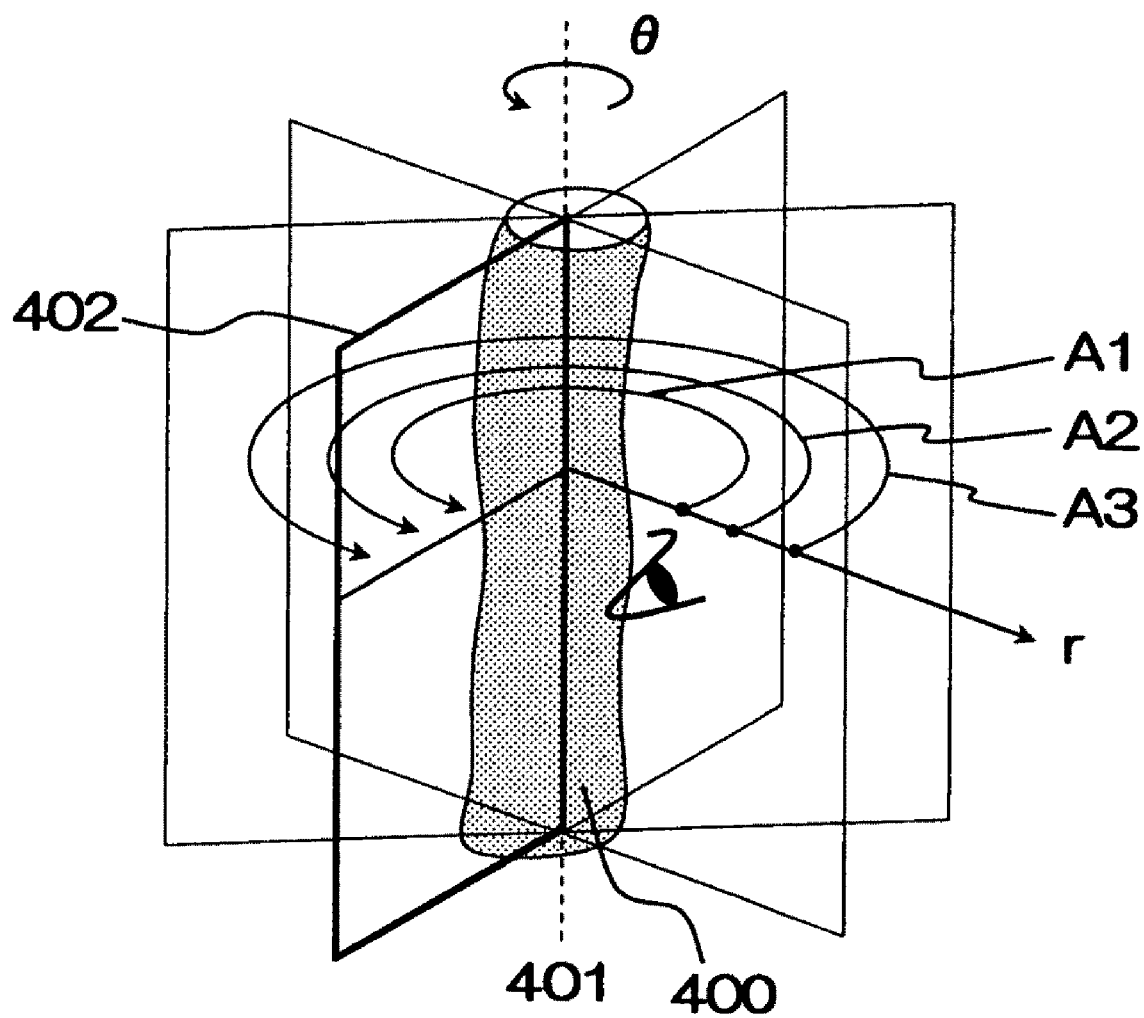
FIG. 35 is a conceptual diagram showing an outline of a 10th embodiment.

FIG. 35 shows an outline of a method of producing an unfolded map in an angular direction. Here is considered, regarding a certain tubular organ 400, a coordinate system of a radial direction from its center line 401 as the reference toward the periphery of the tubular organ 400 (r axis) and an angular direction indicating the angle in the circumferential direction with reference to the center line 401 (θ axis). A projection plane 402 parallel to the center line 401 is set, and pixel values at equal distances in the radial direction with reference to any coordinates on the center line 401 are projected over any angle θ around the center line 401. This project over any radial range in the radial direction is the density distribution in the angular direction. What derives from calculation of this density distribution in the angular direction in the running direction (the center line direction) of a tubular organ and arrangement of the calculated results is the unfolded map.

Figure 36:
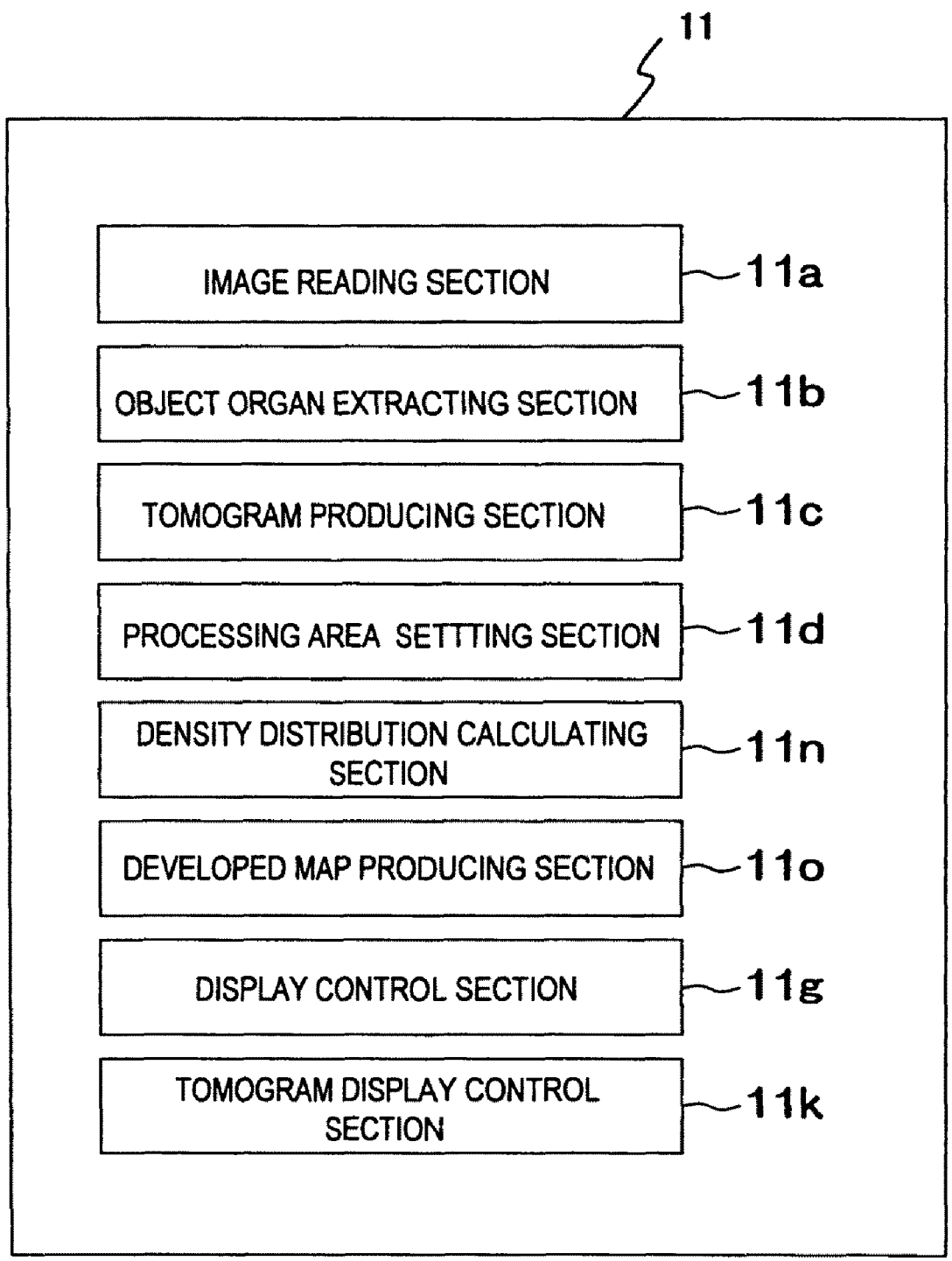
FIG. 36 is a program block diagram of the 10th embodiment.

FIG. 36 is a block diagram showing the configuration of a program pertaining to this embodiment.

A CPU 11 executes an image reading section 11*a*, an object organ extracting section 11*b*, a tomogram producing section 11*c*, a processing area setting section 11*d*, a density distribution calculating section 11*n*, an unfolded map producing section 11*o*, a display control section 11*g* and a tomogram display control section 11*k*, which together constitute a program. Of these sections, as the image reading section 11*a*, the object organ extracting section 11*b*, the tomogram producing section 11*c*, the processing area setting section 11*d* and the tomogram display control section 11*k* are the same as in the first embodiment, their description will be dispensed with. Incidentally, the display control section 11*g* in this embodiment performs the display control of unfolded maps instead of angle maps.

The density distribution calculating section 11*n* calculates the density distribution by calculating, in the radial direction around any center point of rotation or area, density information representing any angular direction around any point in the processing area on a tomogram produced by the tomogram producing section 11*c*.

The unfolded map producing section 11*o* produces an unfolded map by mapping density values in the processing area on coordinates having axes representing the radial direction and the center line direction.

These programs are installed in the image display apparatus 10 of FIG. 1 and stored in the data storage device 13, and read out by the CPU 11 as appropriate into the main memory 12 for execution.

Figure 37:
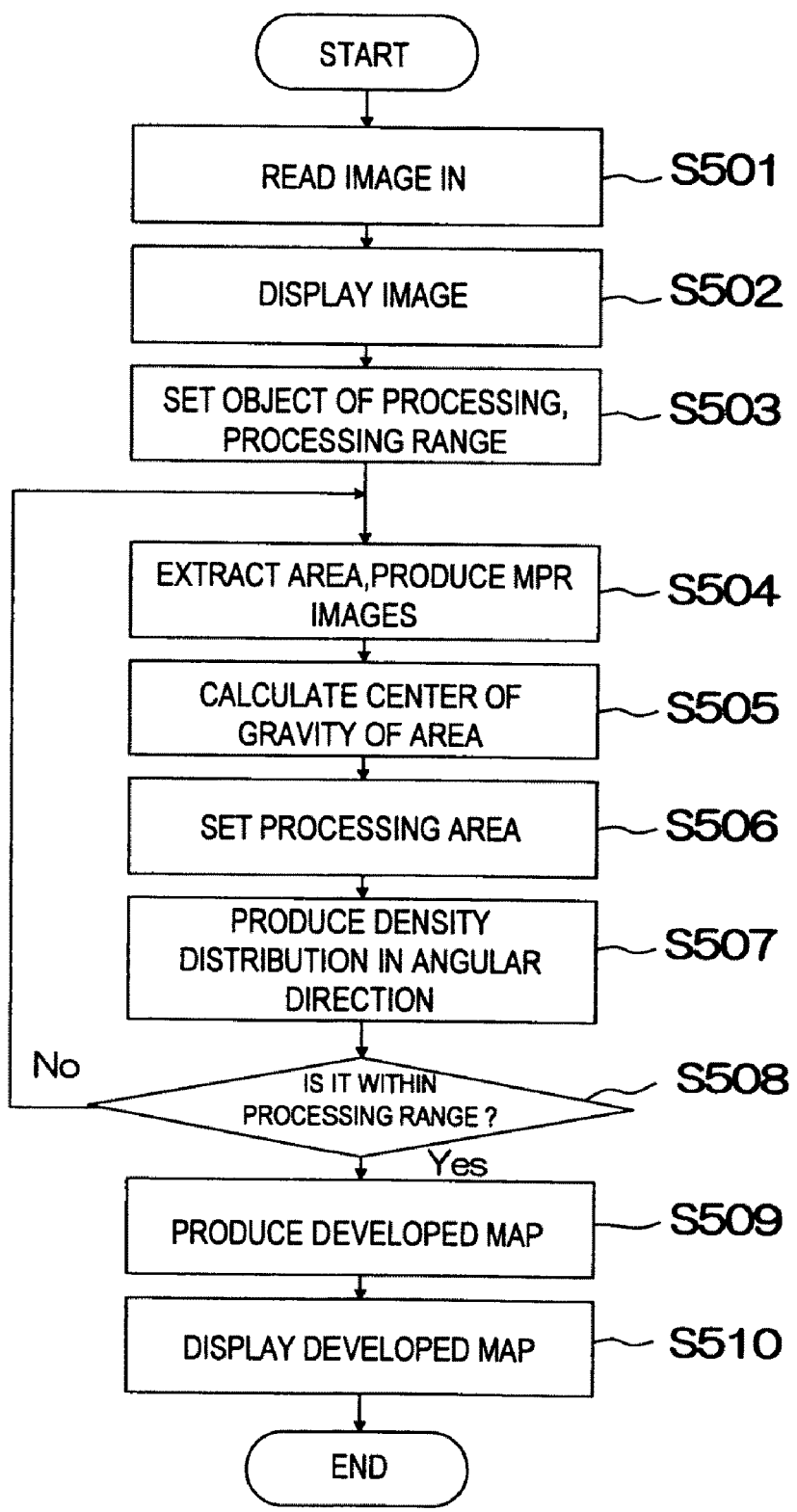
FIG. 37 is a flow chart of the flow or processing in the 10th embodiment

Next, the processing to have the image display apparatus 10 configured as described above display an unfolded map indicating image information on a tubular organ will be described with reference to FIG. 37. FIG. 37 is a flow chart of the flow of processing to display an unfolded map. The CPU 11 controls the image display apparatus 10 following this flow chart. Description of the processing from S501 through S506 will be dispensed with because it is similar to the processing from S101 through S106.

(Step S507)

Figure 38:
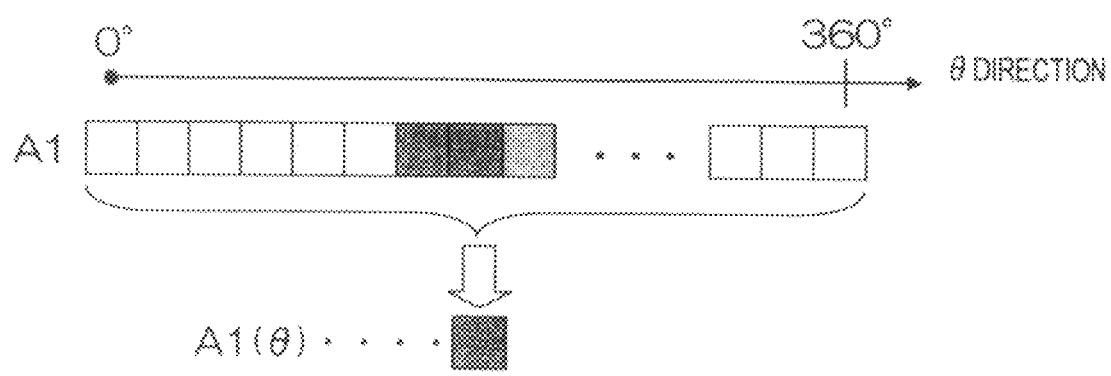
FIG. 38 illustrates processing to calculate density information representing an angular direction.
Figure 39:
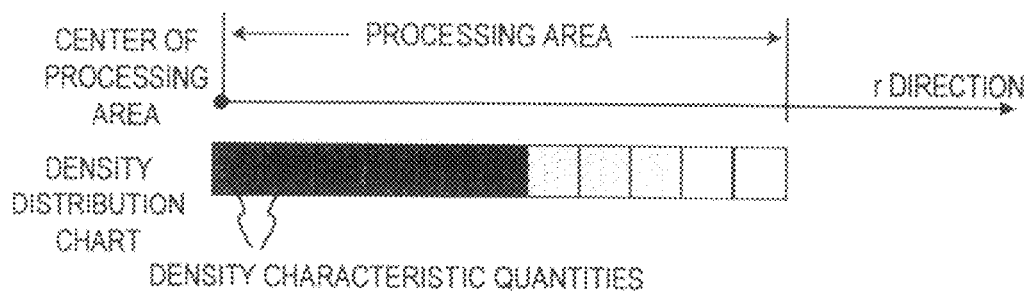
FIG. 39 is a schematic diagram showing density distribution in an angular direction.

The density distribution calculating section 11*n* calculates the density distribution by calculating, in the radial direction around the desired center point of rotation or area, density information representing any angular direction around a point of intersection with the center line on a tomogram produced by the tomogram producing section 11*c*. Processing at this step will be described with reference to FIG. 43. The density distribution calculating section 11*n* calculates density information from pixel values consecutive in the θ direction (angular direction) at any r coordinates. More specifically, concentric circles around the center line 401 of the tubular organ 400 are set in the radial direction (r direction) at prescribed intervals, and arcs of a prescribed angle θ (where θ is 360°, the full circle) are designated as A1(θ), A2(θ) and A3(θ). The density distribution calculating section 11n calculates representative density information by applying the maximum value projection method or the addition averaging method to the pixel value of pixels positioned on the arc A1(θ) as shown in FIG. 38. The density distribution calculating section 11n processes all the arcs A2(θ) and A3(θ) in the same way. Then, the density distribution calculating section 11n arranges the representative values figured out as described above along the radiuses of A1(θ), A2(θ) and A3(θ), namely the distances from the center line 401. This processing is similar to the processing by which the representative values of A1(θ), A2(θ) and A3(θ) are arranged the radial direction (r direction). FIG. 39 is a schematic diagram showing density distribution in the angular direction in which the representative values of A1 (θ), A2(θ) and A3(θ) are arranged in the radial direction (r direction) (Step S508).

It is determined whether or not processing from steps S504 through S507 have been completed to the extent set at step S503 (S508). If the end point of the extracted area has not been reached, the processing returns to step S504 to produce an MPR image of the next region in the area, and processing from S505 through S507 is performed to figure out an angular direction density distribution 420 in each MPR image. When the processing of the whole area extracted as the tubular organ area is completed, the processing moves on to step S509. Incidentally, in the foregoing description the density distribution calculating section 11n determines whether or not the processing has been completed to the extent set at step S503, this determination may as well be made by the unfolded map producing section 11o or a separate determining section may be provided for the purpose.

(Step S509)

At S509, the unfolded map producing section 11o produces an unfolded map (S509). An unfolded map is produced by stacking in the direction of the center line 401 of the tubular organ 400 the angular direction density distributions produced by the unfolded map producing section 11o. The unfolded map producing section 11o defines a two-dimensional coordinate system of which the horizontal axis is the positional axis in the radius direction representing the distance from the center line of the tubular organ and the vertical axis is the positional axis representing the position in the center line direction of the tubular organ. The density distributions in the angular direction calculated by the density distribution calculating section 11n are mapped on that two-dimensional coordinate system.

(Step S510)

Figure 40:
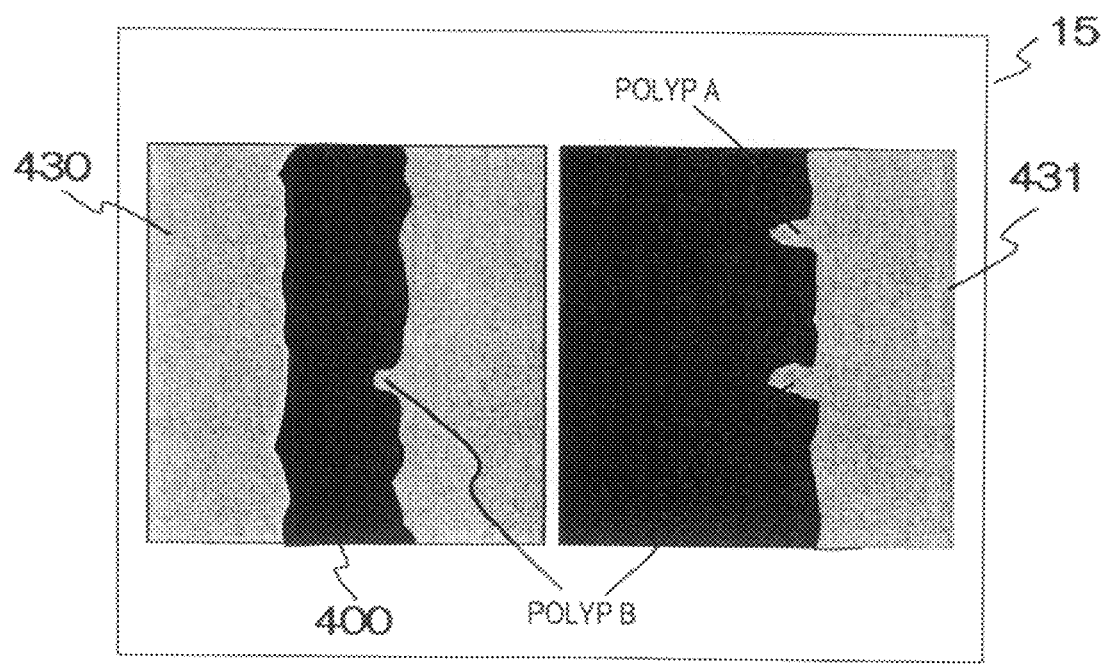
FIG. 40 is a schematic diagram showing an example of displaying an unfolded map.

At S510, the display control section 11g displays the unfolded map on the display (S510). Pixels having an image information value Q correlated to lesions such as soft plaques or calcification are represented in a way well noticeable to the reading person, by differentiation in coloring or blinking for instance. FIG. 40 shows an example of displaying an unfolded map. FIG. 40 shows parallel displaying by the tomogram display control section 11k of a CPR image 430 on the left side and an unfolded map 431 on the right side of the display 15. The unfolded map 431 is produced of an intestinal tube having polyps A and B by applying the maximum projection method. In the unfolded map 431, the start point of the horizontal axis represents the position of the center line 401 and the transition distance in the radial direction. The vertical axis represents the position of the center line 401 in the running direction. Since only a random section of an intestinal tube is displayed on the CPR image 430, the position of the polyp A cannot be presented to the operator, but it is made possible to present to the operator the presence of the polyp A and its size in the radial direction (the height of the polyp) by producing the unfolded map 431 in the angular direction.

Figure 41A:
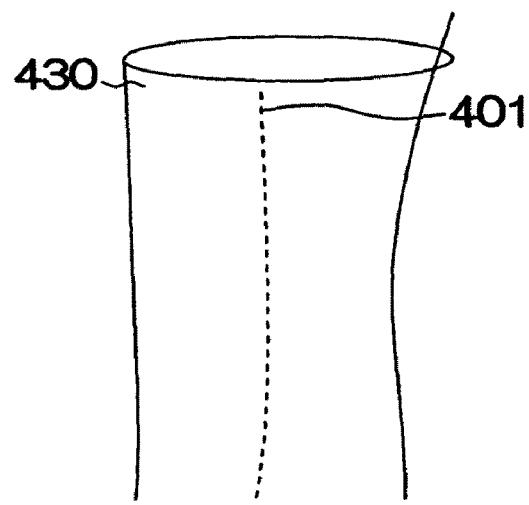
FIG. 41(a) is a schematic diagram showing a tubular organ area and its center line.
Figure 41B:
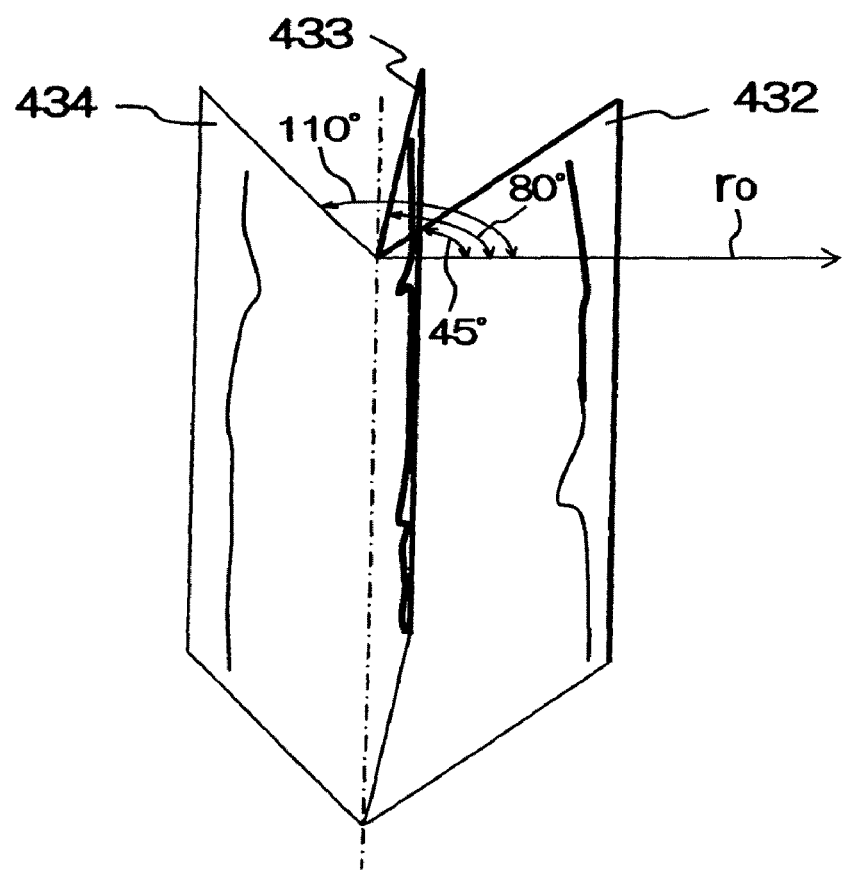
FIG. 41(b) is a schematic diagram showing a case of production an unfolded map in any angle.

Whereas this unfolded map 431 represents angular information in the range of 360 degrees around the center line 401, the unfolded map producing section 11o may as well produce unfolded maps 432, 433 and 434 on the basis of the pixel values of pixels at any angles in the right hand direction $r_o$, for instance 45°, 80° and 110°, a reference position, such as the right hand direction $r_o$ of the center line 401 being supposed to be 0° as shown in FIG. 41. Further, the display control section 11g may display these unfolded maps 432, 433 and 434 in a cine-mode. Production of unfolded maps at random angles and cine-mode displaying may be requested by the operator by clicking the circumference of the center line 401 with the mouse 16, or icons for making such requests may be displayed as appropriate on the display 15.

FIG. 42 shows an example of actually displaying in parallel the unfolded map 431 and the CPR image 430. A parameter setting section 470 for setting the displaying conditions of the unfolded map 431 and the CPR image 430 is provided on the screen of the display 15. Examples of parameters include an "analytical mode" for designating the object of analysis such as the heart muscle, 3d or the coronary artery, the "mouse mode" for setting the controlled state of the mouse 16, "WL/WW" for setting the window level and window width for displaying the unfolded map 431 and the CPR image 430, and "viewpoint setting" for setting the sectional angles of the unfolded map 431 and the CPR image 430; a detail setting section 471 for setting more details of a mode set in the analytical mode, such as the coronary artery mode. The detail setting section 471 can set the maximum projection method (MIP), the minimum projection method (MINIP) and the accumulated value (RaySum) as conditions for density calculation. These are just examples of parameters that can be set, and available parameters are not limited to these.

In this embodiment, analytical information on the polyps A and B on the unfolded map 431 may be displayed as in the seventh embodiment. Or the display control section 11g may display the unfolded map 431 alone on the display 15.

Also, similar to the angle map table and polar coordinate maps mentioned earlier, the position of the tissue to be detected may be displayed.

11th Embodiment

This embodiment is another embodiment regarding unfolded maps. An unfolded map pertaining to this embodiment is derived by setting a section in the longitudinal direction parallel to the center line 401 of the tubular organ area 400 and mapping on a positional axis representing the radial direction density values representative of a string of pixels consecutive in the direction parallel to the center line direction in each position in the radial direction regarding CPR images contained in that section in the longitudinal direction. In this processing in the 10th embodiment, the tomogram producing section 11c produces a CPR image, the processing area setting section 11d sets as the processing area a pixel string in the direction parallel to the center line direction of the tubular organ in the CPR image, the density distribution calculating section 11n calculates as density information the pixel values representative of the pixel string set as the processing area, and the unfolded map producing section 11o maps the calculated density information in the axis of the tubular organ in the radial direction to produce an unfolded map.

Figure 43:
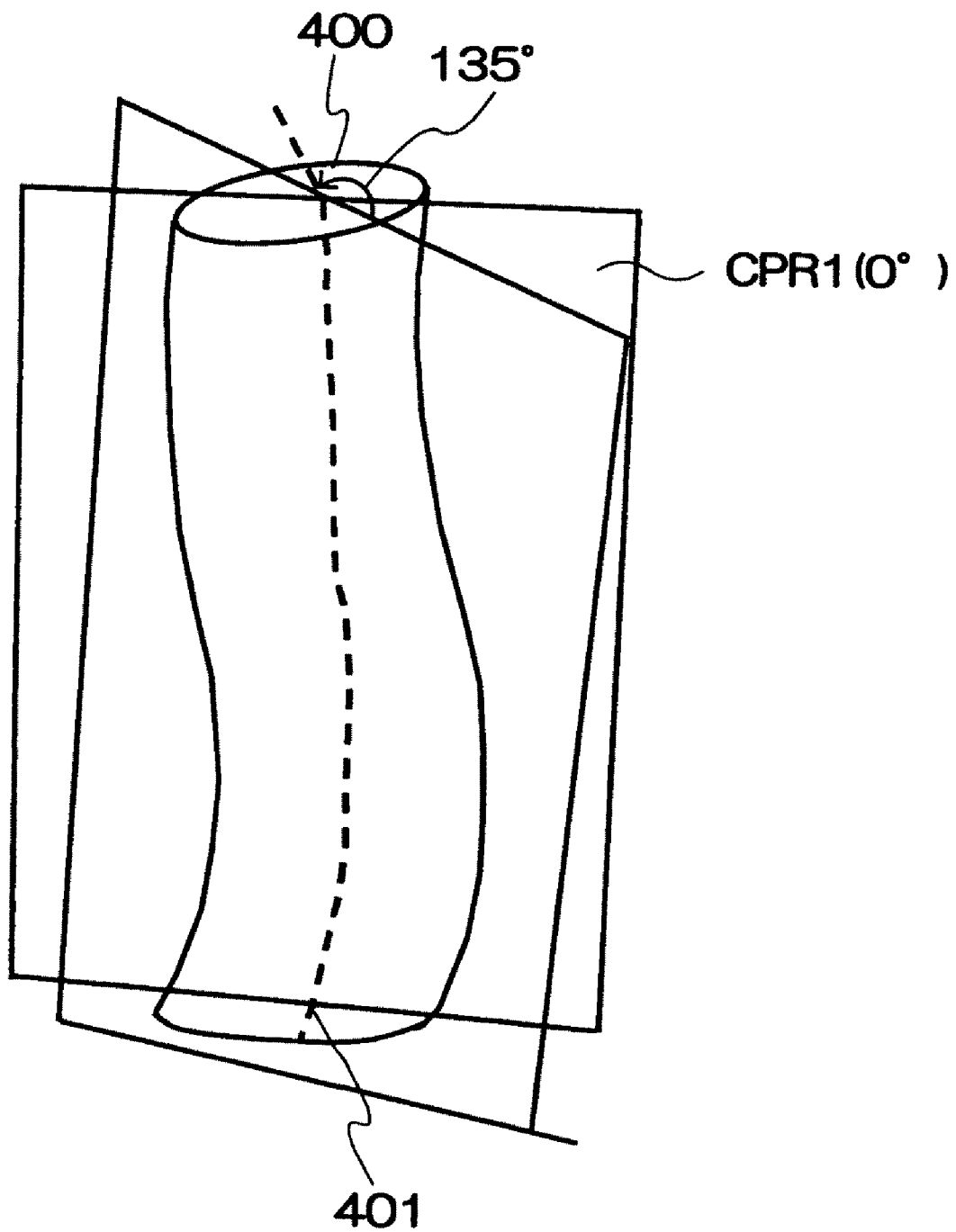
FIG. 43 is a schematic diagram showing an example of section in a longitudinal direction.

FIG. 43 shows a section in the longitudinal direction referred to above. The right direction in FIG. 48 being supposed to be 0° and the section in the longitudinal direction, which is parallel to the 0° direction and parallel to the running direction is designated to be CPR1)(0°. The section in the longitudinal direction is set over a 180° range around the center line 401. Although CPR2)(135° is shown in FIG. 48, a more section or sections in the longitudinal direction may further be set.

Figure 44A:
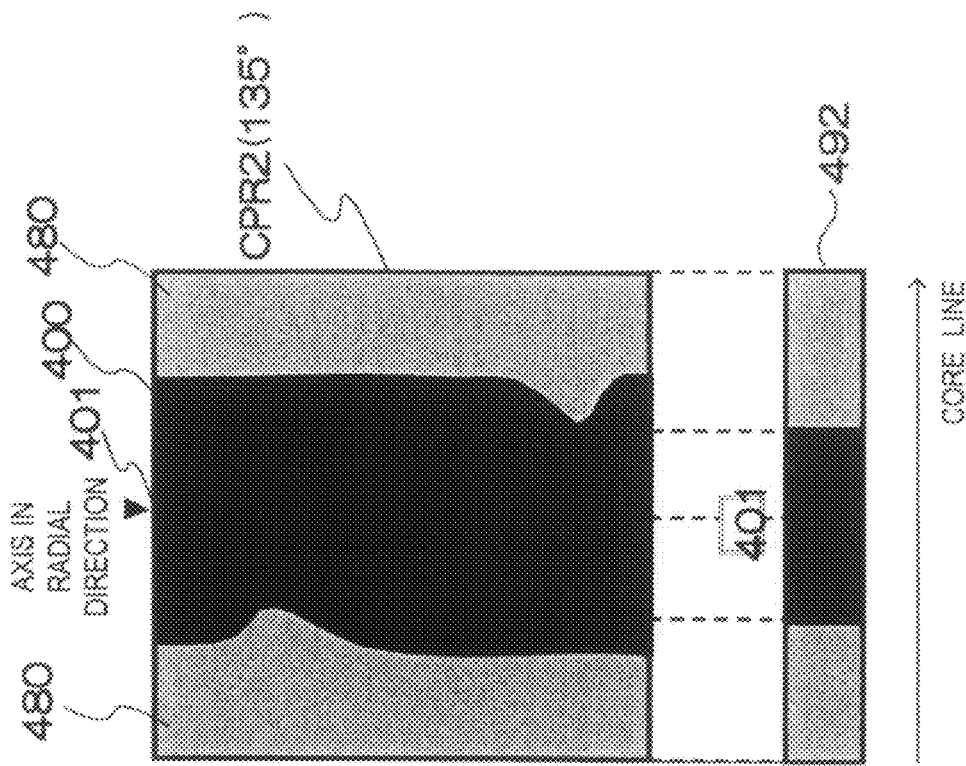
FIGS. 44(a) and 44(b) are conceptual diagrams showing unfolded map production in an 11th embodiment.
Figure 44B:
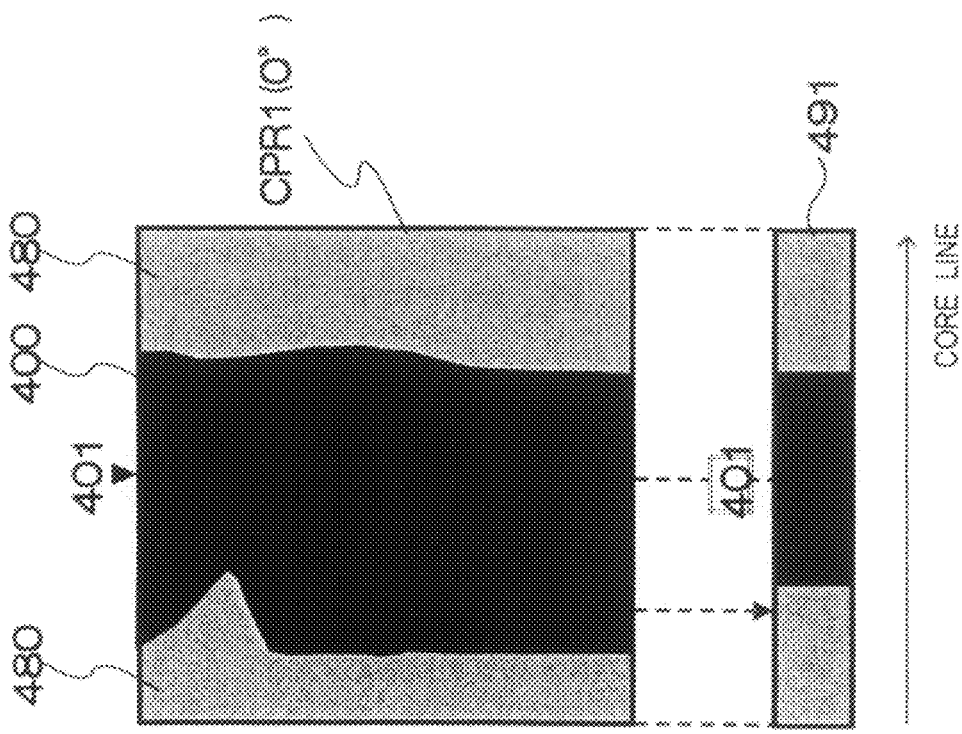

FIGS. 44(a) and 44(b) show CPR images of CPR1)(0° and CPR2)(135° and unfolded maps 491 and 492 matching these CPR images. CPR1)(0° and CPR2)(135° include the tubular organ area 400 and a tissue area 480 surrounding it. For the unfolded maps 491 and 492, the highest density values out of the density values of pixels of CPR1)(0° and CPR2)(135° arranged in the longitudinal direction are mapped. For instance, whereas the pixel string along the dotted arrow in CPR1)(0° contains the tissue area 480 and the tubular organ area 400, those of the highest density values, namely the density values of the pixels constituting the tissue area 480 are supposed to be the pixel values representative of the pixel string along the dotted arrow. This processing is repeated from one end of the sectional diameter of the tubular organ area 400 to the other end past the center of gravity (the center line 401), and arraying the representative values of the pixel strings along the sectional diameter to produce the unfolded maps 491 and 492. The unfolded maps 491 and 492 may as well be successively stacked from 0° to be displayed in form.

This embodiment enables the size in the radial direction of the most constricted part of the tubular organ in a given CPR image, namely the polyp-stricken part of the inner wall of the tubular organ, to be assessed by only looking at unfolded maps without having to see the whole CPR image.

In these embodiments described above, density information on the object organ is displayed unified into angle maps, angle map tables, polar coordinate maps and unfolded maps. For this reason, the visual recognizability of density information on the object organ is enhanced; for instance, abnormal parts, such as soft plaques, in a blood vessel can be readily discovered.

INDUSTRIAL APPLICABILITY

The invention can be applied not only to medical images but also to applications for shooting hollow members with an industrial X-ray CT apparatus and having the state of its inner wall displayed.

The invention claimed is:

1. An image display apparatus comprising:
   a device which reads in an image data set of a subject acquired by a medical imaging apparatus from a data recording device which stores the image data set;
   an input device which inputs a desired object organ to the read-in image data set;
   an object organ extracting device which extracts the inputted object organ;
   a reference position setting device which sets a reference position of the extracted object organ;
   a calculating device which calculates at least one of (a) a radial direction value representing density values of pixels arrayed in a radial direction of the object organ, the radial direction value being at least one of maximum value, minimum value and average value of the density values of pixels arrayed in the radial direction of the object organ, and (b) an angular direction value representing density values of pixels arrayed in angular direction of the object organ; and
   an image display device which displays at least one of (i) the radial direction value on a plane including a positional axis indicating positions in the center line direction of the object organ and an angular direction axis indicating angles around the center line of the object organ from the set reference position and (ii) the angular direction value on a plane including the positional axis and a radial direction axis indicating distances from the center line of the object organ.

2. The image display apparatus according to claim 1, wherein
   the calculating device comprises an angle map producing device which calculates the radial direction value at every prescribed angle from the set reference position to produce an angle map in which the radial direction value is related to the prescribed angle, and
   the image display device displays the produced angle map, wherein the angle map has the positional axis as vertical axis and the angular direction axis as horizontal axis.

3. The image display apparatus according to claim 1, wherein
   at least one out of an axial image, a coronal image, a sagittal image and a three-dimensional image which are images containing the object organ is displayed on the image display device, and
   the reference position setting device sets a reference position to the object organ by referencing the displayed image.

4. The image display apparatus according to claim 1, wherein
   at least one of the radial direction value and the angular direction value and at least one out of a multiplanar reconstruction image, a curved planar reconstruction image and a three-dimensional image containing the object organ are displayed on the image display device, and
   the reference position setting device sets a reference position to the object organ by referencing the displayed image.

5. The image display apparatus according to claim 2, wherein the position of a section of a detection result matching the angle map set by the angle map producing device is displayed being matched with an angle map table displayed on the image display device.

6. The image display apparatus according to claim 2, wherein
   a manipulation bar for moving position of a section matching the angle map set by the angle map producing device is provided, and
   at least one out of a multiplanar reconstruction image, a curved planar reconstruction image and a three-dimensional image containing the object organ interlocked with the manipulation bars is displayed on the image display device.

7. The image display apparatus according to claim 1, wherein the calculating device comprises a polar coordinate map producing device which calculates the radial direction value at every prescribed angle from the set reference position to produce a polar coordinate map in which the radial direction value is related to the prescribed angle, and the image display device displays the produced polar coordinate map, wherein the polar coordinate map has the positional axis as radial axis and the angular direction axis as angular axis.

8. The image display apparatus according to claim 7, wherein the polar coordinate map producing device produces the polar coordinate map and produces the main trunk branch map and split branch maps of the object organ over the produced polar coordinate map.

9. The image display apparatus according to claim 7, further comprising a notable pixel value setting device which sets a notable pixel value of the object organ, wherein
the polar coordinate map producing device produces the polar coordinate map,
the notable pixel value setting device sets a notable pixel value of the object organ on the produced polar coordinate map, and
the image display device displays the set notable pixel value over the polar coordinate map.

10. The image display apparatus according to claim 2, wherein
the angle map produced by the angle map producing device and at least one out of a multiplanar reconstruction image, a curved planar reconstruction image and a three-dimensional image containing the object organ are displayed on the image display device, and
at least one out of the length, angle and imaging condition of the relevant region of the object image is displayed over the displayed angle map.

11. The image display apparatus according to claim 2, wherein the angle map producing device displays in parallel a curved planar reconstruction image figured out from the calculated pixel information and an angle map.

12. The image display apparatus according to claim 1, wherein the calculating device comprises an unfolded map producing device which calculates the angular direction value at every prescribed distance from the center line of the object organ to produce an unfolded map in which the angular direction value is related to the prescribed distance, and the image display device displays the produced unfolded map, wherein the unfolded map has the positional axis as vertical axis and the radial direction axis as horizontal axis.

13. The image display apparatus according to claim 2, further comprising a center line setting device which sets a center line of the object organ, wherein
the angle map produced by the angle map producing device and a curved planar reconstruction image containing the object organ are displayed on the image display device, and
the center line setting device which sets the center line in any radial direction of the object organ by referencing the displayed image.

14. An image display program in a non-transitory medium embodying instructions causing a computer to execute:
a step of reading in an image data set of a subject acquired by a medical imaging apparatus from a data recording device which stores the data set;
an input step of inputting a desired object organ to the read-in image data set;
an object organ extracting step of extracting the inputted object organ;
a reference position setting step of setting a reference position of the extracted object organ;
a calculating step of calculating at least one of (a) a radial direction value representing density values of pixels arrayed in a radial direction of the object organ, the radial direction value being at least one of maximum , minimum value and average value of the density values of pixels arrayed in the radial direction of the object organ, and (b) an angular direction value representing density values of pixels arrayed in angular direction of the object organ; and
an image displaying step of displaying at least one of (i) the radial direction value on a plane including a positional axis indicating positions in the center line direction of the object organ and an angular direction axis indicating angles around the center line of the object organ from the set reference position and (ii) the angular direction value on a plane including the positional axis and a radial direction axis indicating distances from the center line of the object organ.

15. An image display method, comprising:
a step of reading in an image data set of a subject acquired by a medical imaging apparatus from a data recording device which stores the data set;
an input step of inputting a desired object organ to the read-in image data set;
an object organ extracting step of extracting the inputted object organ;
a reference position setting step of setting a reference position of the extracted object organ;
a calculating step of calculating at least one of (a) a radial direction value representing density values of pixels arrayed in a radial direction of the object organ, the radial direction value being at least one of maximum value, minimum value and average value of the density values of pixels arrayed in the radial direction of the object organ, and (b) an angular direction value representing density values of pixels arrayed in angular direction of the object organ; and
an image displaying step of displaying at least one of (i) the radial direction value on a plane including a positional axis indicating positions in the center line direction of the object organ and an angular direction axis indicating angles around the center line of the object organ from the set reference position and (ii) the angular direction value on a plane including the positional axis and a radial direction axis indicating distances from the center line of the object organ.

* * * * *